US012192152B2

(12) United States Patent
Yiu et al.

(10) Patent No.: US 12,192,152 B2
(45) Date of Patent: Jan. 7, 2025

(54) TECHNIQUES IN MEASUREMENT GAP (MG) CONFIGURATIONS WITH BANDWIDTH PART (BWP)

(71) Applicant: Apple Inc., Cupertino, CA (US)

(72) Inventors: Candy Yiu, Portland, OR (US); Jie Cui, Santa Clara, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 630 days.

(21) Appl. No.: 17/276,750

(22) PCT Filed: Sep. 16, 2019

(86) PCT No.: PCT/US2019/051366
§ 371 (c)(1),
(2) Date: Mar. 16, 2021

(87) PCT Pub. No.: WO2020/060952
PCT Pub. Date: Mar. 26, 2020

(65) Prior Publication Data
US 2022/0052828 A1 Feb. 17, 2022

Related U.S. Application Data

(60) Provisional application No. 62/732,507, filed on Sep. 17, 2018.

(51) Int. Cl.
*H04L 5/00* (2006.01)
*H04W 56/00* (2009.01)

(52) U.S. Cl.
CPC .......... *H04L 5/0098* (2013.01); *H04L 5/0053* (2013.01); *H04W 56/001* (2013.01)

(58) Field of Classification Search
CPC ..... H04L 5/0098; H04L 5/0053; H04L 5/001; H04L 5/005; H04L 5/0091; H04W 56/001; H04W 48/16; H04W 76/28; H04W 48/12; H04W 24/10; H04W 56/00
See application file for complete search history.

(56) References Cited

U.S. PATENT DOCUMENTS 11,057,184 B2   7/2021   Orsino et al.
11,791,972 B2   10/2023  Orsino et al.
(Continued)

FOREIGN PATENT DOCUMENTS

CN   104168098 A   11/2014
CN   105850192 A   8/2016
(Continued)

OTHER PUBLICATIONS

International Search Report and Written Opinion of the International Searching Authority directed to related International Patent Application No. PCT/US2019/051366, mailed Jan. 3, 2020, 16 pages.
(Continued)

*Primary Examiner* — Eric Myers
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for configuring and utilizing measurement gaps (MGs) based on bandwidth part (BWP) in intra-frequency measurements in New Radio (NR) involved networks. Various embodiments describe how to utilize (or not utilize) one or more configured MGs so that a user equipment (UE) and/or an access node (AN) may improve throughput performance, network efficiency and other efficiencies. Other embodiments may be described and claimed.

18 Claims, 8 Drawing Sheets

(56) References Cited

U.S. PATENT DOCUMENTS

| | | |
|---|---|---|
| 2010/0098012 A1 | 4/2010 | Bala et al. |
| 2016/0323901 A1 | 11/2016 | Yum et al. |
| 2017/0034808 A1 | 2/2017 | Ouchi et al. |
| 2017/0055242 A1 | 2/2017 | Kusashima et al. |
| 2018/0049047 A1 | 2/2018 | Lin et al. |
| 2018/0183551 A1 | 6/2018 | Chou et al. |
| 2019/0182000 A1 | 6/2019 | Futaki |
| 2023/0070204 A1* | 3/2023 | Kim ............... H04W 56/00 |

FOREIGN PATENT DOCUMENTS

| | | |
|---|---|---|
| CN | 106233805 A | 12/2016 |
| DE | 11 2018 004 516 T5 | 6/2020 |
| WO | WO 2018/084544 A1 | 5/2018 |
| WO | WO 2019/160473 A1 | 8/2019 |
| WO | WO 2019/160493 A1 | 8/2019 |

OTHER PUBLICATIONS

Huawei et al., "Measurement gap configuration in NR", R2-1800482, 3GPP TSG RAN WG2 Ad Hoc, Vancouver, Canada, Jan. 12, 2018.

Ericsson, "Introduction of SA", R2-1813492, 3GPP TSG RAN WG2 #103, Gothenburg, Sweden, Sep. 5, 2018.

Huawei et al., "Discussion on LS on gap-assisted serving cell measurement", R4-1810699, 3GPP TSG RAN WG4 #88, Gothenburg, Sweden, Aug. 10, 2018.

Intel Corporation, "Motivation to introduce new WI of measurement gap enhancement", R4-1809870, 3GPP TSG RAN WG4 #88, Gothenburg, Sweden, Aug. 10, 2018.

Qualcomm Incorporated, "Gap assisted measurements", R2-1811131, 3GPP TSG RAN WG2 #103, Gothenburg, Sweden, Aug. 10, 2018.

Extended European Search Report for Application No. 19863239.0 mailed Nov. 2, 2021, 19 pages.

Ericsson, "Configuration of measurement gap in NR", 3GPP Draft; R2-1713737, Measurement Gap Configuration in NR, 3rd Generation Partnership Project (3GPP), vol. RAN WG2, No. Reno, USA, Nov. 17, 2017, XP051372395, 3 pages.

Interdigital et al., "Details of BWP switching operation," 3GPP Draft; R1-720556 (R15 NR WI AI 7341 Details of BWP Switching Operation), 3rd Generation Partnership Project (3GPP), vol. RAN WG1, No. Reno, USA, Nov. 18, 2017, 4 pages.

International Preliminary Report on Patentability for International Application No. PCT/US2019/051366, The International Bureau of WIPO, mailed on Jan. 3, 2020, 12 pages.

* cited by examiner

TECHNIQUES IN MEASUREMENT GAP (MG) CONFIGURATIONS WITH BANDWIDTH PART (BWP)

CROSS REFERENCE TO RELATED APPLICATION

The present application is a U.S. National Phase of International Application No. PCT/US2019/051366, filed Sep. 16, 2019, which claims priority to U.S. Provisional Patent Application No. 62/732,507, filed Sep. 17, 2018, entitled "Measurement Gap (MG) Configuration During Bandwidth Part (BWP)," the entire disclosures of which are hereby incorporated by reference in their entireties.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Various Fifth Generation (5G) New Radio (NR) involved communications and/or networks have been developed in broad frequency ranges, such as sub-6 GHz and millimeter wave (mmWave). Existing intra-frequency measurement may always configure a measurement gap (MG) due to relatively fast bandwidth part (BWP) switching than MG reconfiguration, when an active BWP is switched to interrupt the intra-frequency measurement in a radio resource management (RRM). This may affect radio resource management (RRM) efficiency with respect to either the UE or the network. New solutions are needed in this regard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
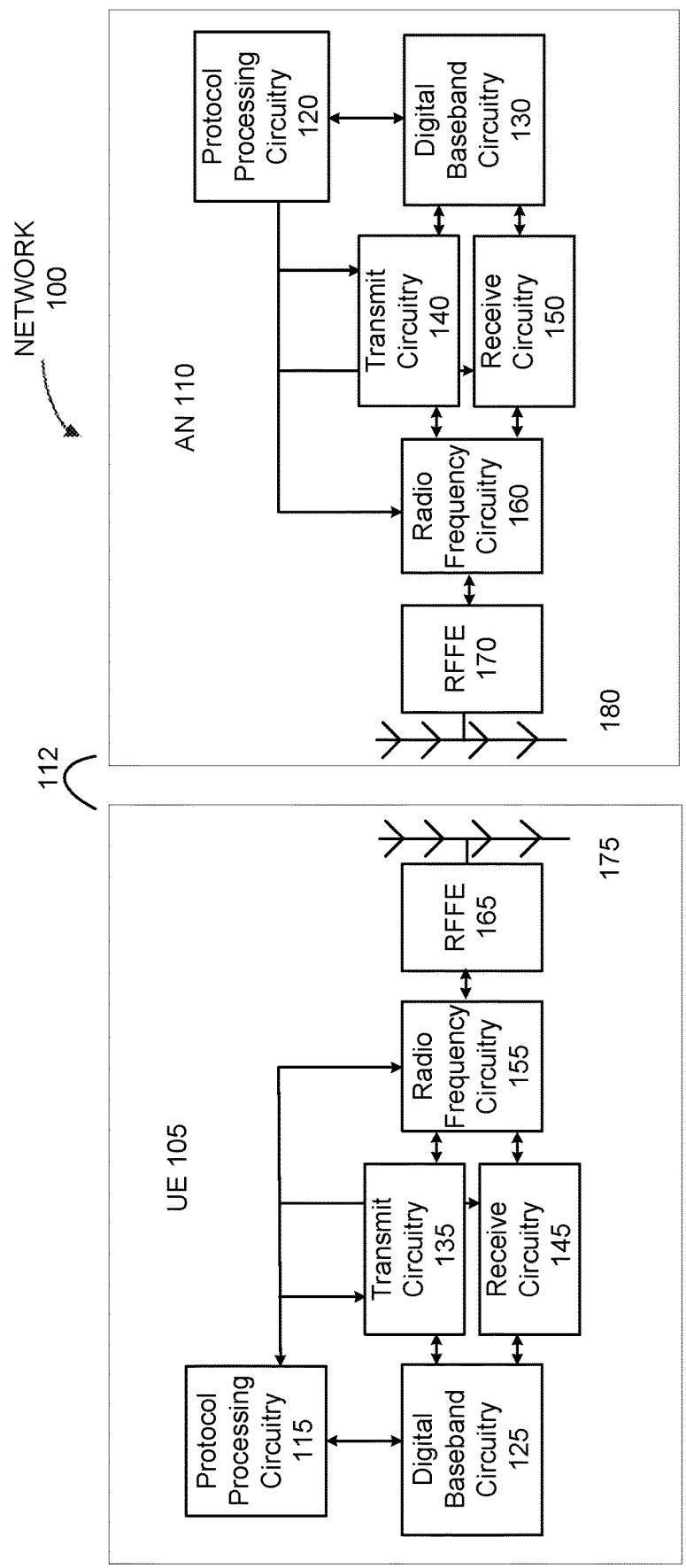
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

There are various bands below 6 GHz in 4G LTE networks. In NR, frequency range 1 (FR1) overlaps and extends 4G LTE frequencies, including various bands from 450 MHz to 6,000 MHz, which is commonly referred to as NR sub-6

GHz. NR further includes a frequency range 2 (FR2) covering from 24,250 MHz to 52,600 MHz, which is commonly referred to as mmWave, even though the millimeter wave frequency may start at 30 GHz strictly speaking. Herein, the pairs of FR1/FR2 and sub-6 GHz (below 6 GHz)/mmWave are used interchangeably.

Multi-Radio Access Technology (RAT) Dual Connectivity (MR-DC) may involve a multiple reception (Rx)/transmission (Tx) UE that may be configured to utilize radio resources provided by two distinct schedulers in two different nodes connected via non-ideal backhaul, one providing Evolved Universal Terrestrial Radio Access (E-UTRA) access and the other one providing NR access. One scheduler is located in a Master Node (MN) and the other in the Secondary Node (SN). The MN and SN are connected via a network interface and at least the MN is connected to the core network.

MR-DC may include E-UTRA-NR Dual Connectivity (EN-DC) or NG-RAN E-UTRA-NR Dual Connectivity (NGEN-DC). In EN-DC communications, a UE may be connected to one evolved NodeB (eNB) that acts as an MN and one en-next generation NodeB (gNB) that acts as an SN. The eNB is connected to an evolved packet core (EPC) and the en-gNB is connected to the eNB. The en-gNB may be a node that provides new radio (NR) user-plane and control-plane protocol terminations towards the UE, and acts as the SN in EN-DC.

A measurement gap configuration configures a gap period repeatedly so that a UE may use the configured period to conduct a non-data duty, for example, cell measurements. The term "measurement" herein refers to one or more measurements involving non-data duty between the UE and network. The measurement may be performed with respect to one or more synchronization signals (SSs) that include one or more SS blocks (SSBs). A UE may use measurement gaps to identify and measure intra-frequency cells, intra-frequency cells, and/or inter-RAT E-UTRAN cells. During a configured MG period, the UE may not be expected to transmit or receive data with serving cell, or like activities.

An MG configuration may correspond to one or more MG patterns on which the UE's operations may be based. The operations may include identifying and measuring cells in the network, and other non-data operations. A UE may be configured with an MG while operating at any frequency in either FR1 or FR2. Such a measurement gap configuration may be referred to as a UE gap or a per UE gap.

Note that terms "measurement gap (MG)" and "gap" are used interchangeably throughout this disclosure, and terms "UE gap," "per-UE gap," "UE MG," "per-UE MG" are used interchangeably throughout this disclosure.

In some situations, a UE may be configured with more than one measurement gap according to different frequencies at which the UE may operate. For example, a UE may comply with respective measurement gaps while operating at FR1 and FR2 to accommodate different operations at different frequency ranges. However, the UE may activate or use one MG and/or MG pattern at any given time. This may affect UE and/or network data processing efficiency. A detailed example is to be illustrated with respect to FIG. 4. Thus, it may improve UE and/or network efficiency if the UE can indicate its capability of supporting multiple MGs and the network can configure one or more MGs accordingly.

Note that terms "FR1 gap," "per-FR1 gap," "FR1 MG," "per-FR1 MG" are used interchangeably throughout this disclosure, and terms "FR2 gap," "per-FR2 gap," "FR2 MG," "per-FR2 MG" are used interchangeably throughout this disclosure. FR1 gap and FR2 gap may be collectively referred to as FR gap.

In an intra-frequency measurement under existing NR RRM, An MG may be configured to a UE regardless whether the SSB is in an active BWP or a non-active BWP. This may negatively affect data throughput performance for the UE and network. Conventionally, the UE and network may have to use the configured MG(s) once they are configured, which means, for example, data activities may halt to yield to the SSB measurements. Further details are illustrated with respect to FIG. 4 and other figures herein.

Embodiments described herein may include, for example, apparatuses, methods, and storage media for configuring and utilizing (or not utilizing) one or more measurement gaps in a BWP switching event during an intra-frequency measurement. The implementation may improve UE and/or network efficiency and allow the UE to perform measurements while not scarifying unnecessary throughput degradation.

FIG. 1 schematically illustrates an example wireless network 100 (hereinafter "network 100") in accordance with various embodiments herein. The network 100 may include a UE 105 in wireless communication with an AN 110. In some embodiments, the network 100 may be a NR SA network. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry shown in FIG. 3. The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
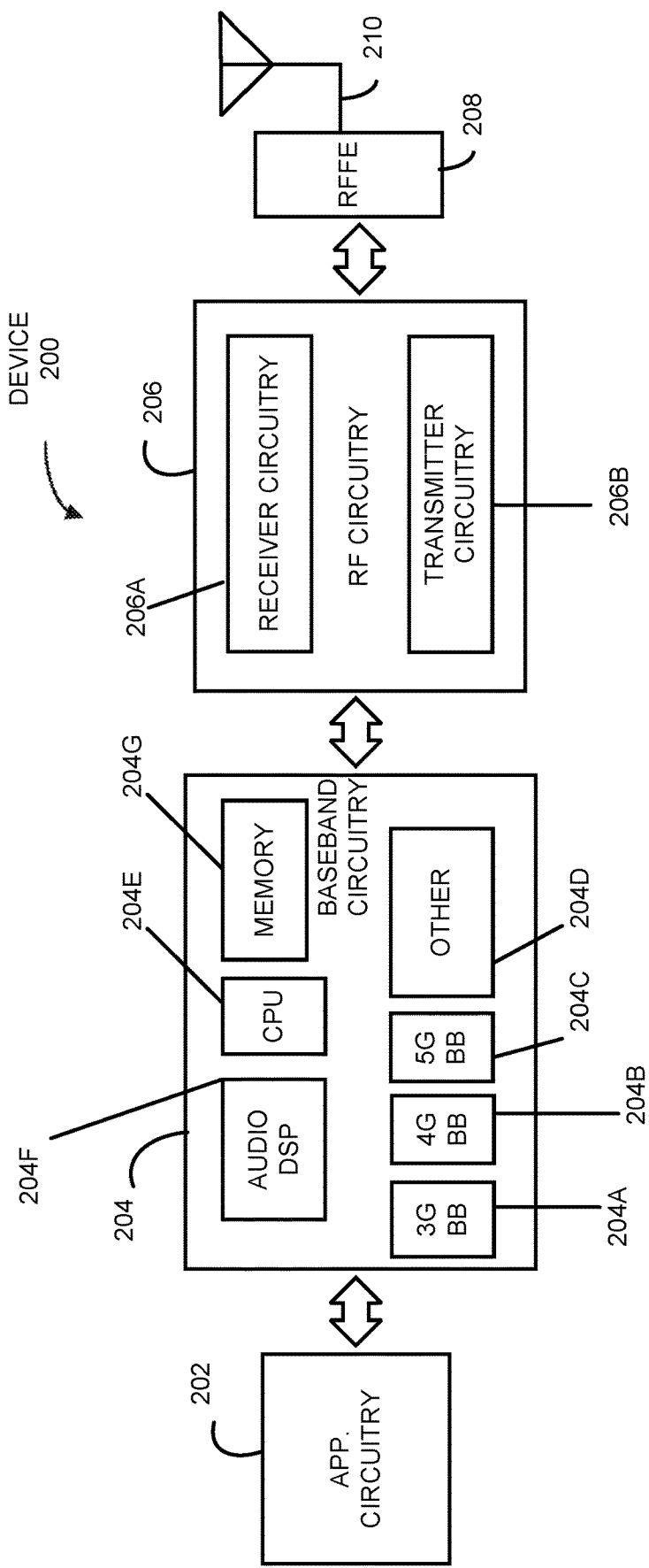
FIG. 2 illustrates example components of a device in accordance with various embodiments.
Figure 6:
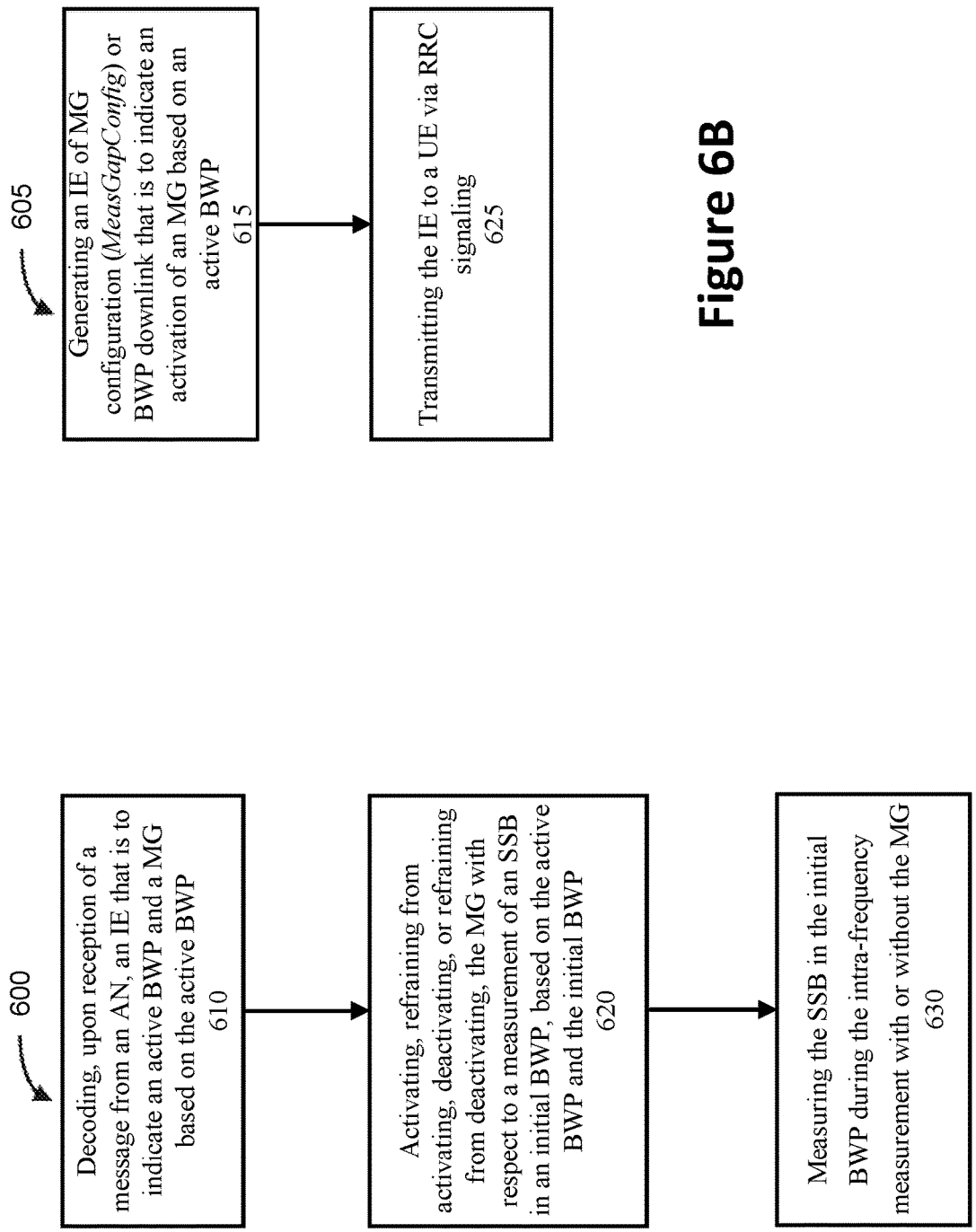
FIG. 6A illustrates an operation flow/algorithmic structure to facilitate a process of configuring and utilizing MG based on BWP in intra-frequency measurements from a UE perspective, in accordance with various embodiments.
FIG. 6B illustrates an operation flow/algorithmic structure to facilitate the process of configuring and utilizing MG based on BWP in intra-frequency measurements from an AN perspective, in accordance with various embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam. FIG. 3 further illustrates details regarding the RFFE 170 and antenna panel 180.

FIG. 2 illustrates example components of a device 200 in accordance with some embodiments. In contrast to FIG. 1, FIG. 2 illustrates example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, a cell may not utilize the application circuitry 202, and instead include a processor/controller to process IP data received from an EPC). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

Figure 3B:
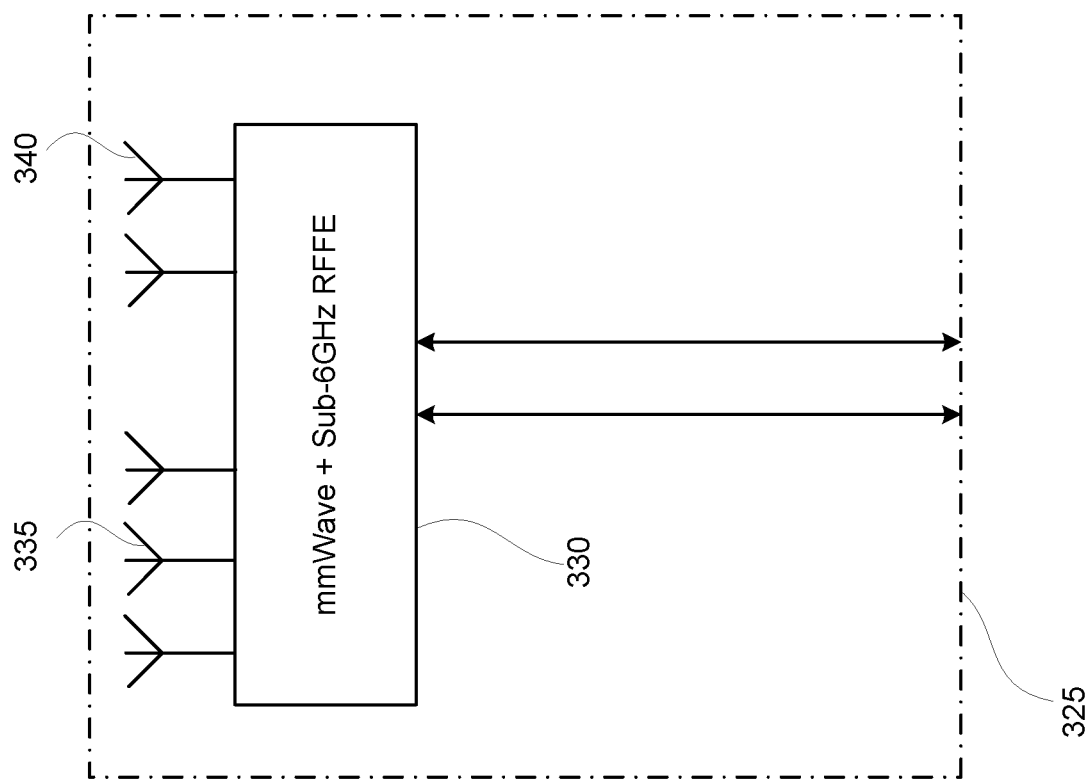
FIG. 3B illustrates an alternative RFFE in accordance with various embodiments.
Figure 3A:
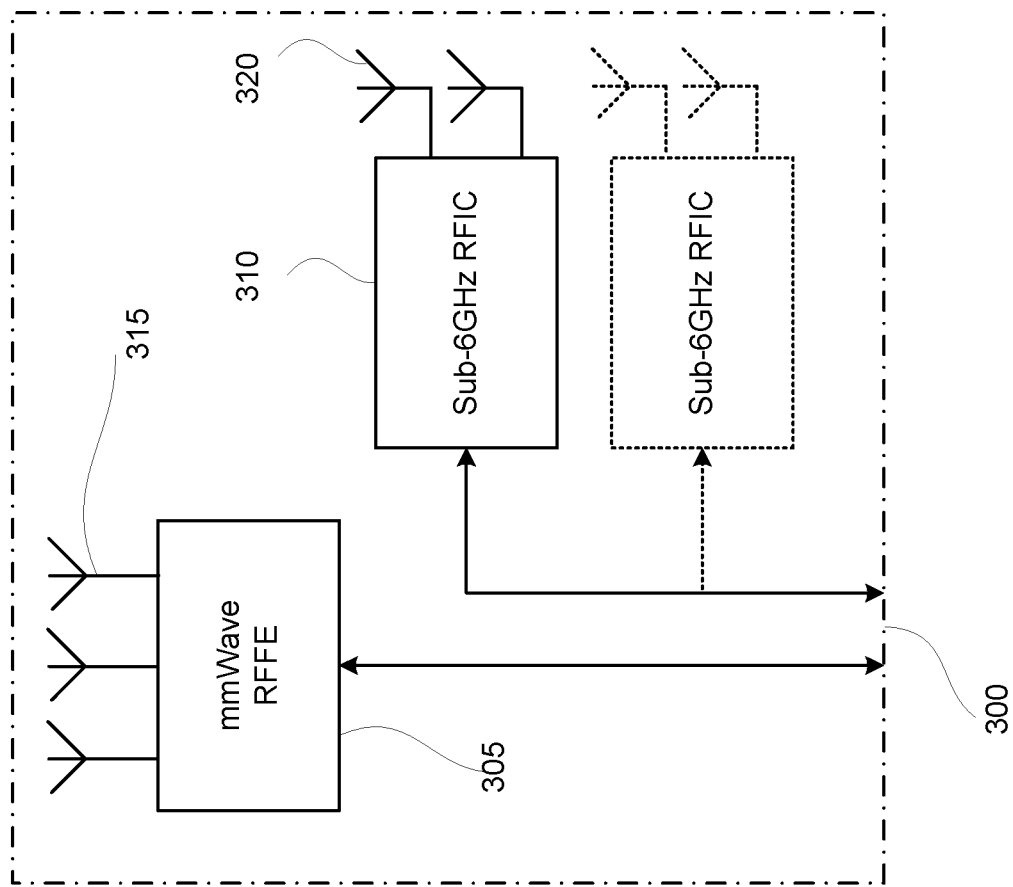
FIG. 3A illustrates an example radio frequency front end (RFFE) incorporating a millimeter Wave (mmWave) RFFE and one or more sub-millimeter wave radio frequency integrated circuits (RFICs) in accordance with some embodiments.

FIG. 3A illustrates an embodiment of a radio frequency front end 300 incorporating an mmWave RFFE 305 and one or more sub-6 GHz radio frequency integrated circuits (RFICs) 310. The mmWave RFFE 305 may be similar to and substantially interchangeable with the RFFE 165, RFFE 170, and/or the RFFE circuitry 208 in some embodiments. The mmWave RFFE 305 may be used for the UE 105 while operating in FR2 or mmWave; the RFICs 310 may be used for the UE 105 while operating in FR1, sub-6 GHz, or LTE bands. In this embodiment, the one or more RFICs 310 may be physically separated from the mmWave RFFE 305. RFICs 310 may include connection to one or more antennas 320. The RFFE 305 may be coupled with multiple antennas 315, which may constitute one or more antenna panels.

FIG. 3B illustrates an alternate embodiment of an RFFE 325. In this aspect both millimeter wave and sub-6 GHz radio functions may be implemented in the same physical RFFE 330. The RFFE 330 may incorporate both millimeter wave antennas 335 and sub-6 GHz antennas 340. The RFFE 330 may be similar to and substantially interchangeable with the RFFE 165, RFFE 170, and/or the RFFE circuitry 208 in some embodiments.

FIGS. 3A and 3B illustrate embodiments of various RFFE architectures for either the UE 105 or the AN 110.

In a cellular network, it may be desirable to measure cell quality, such as reference signal received power (RSRP), reference signal received quality (RSRQ), signal to noise and interference ratio (SINR), and/or other like quality measurements, for handover to a neighbor cell and/or adding a new carrier component (CC) in a carrier aggregation (CA). With LTE, a cell-specific reference signal (CRS) may be transmitted continuously so that the UE may measure the cell quality of a neighbor cell. By contrast, NR does not have reference signal CRS, which may reduce resource overhead and interference to other cells. With NR, synchronization signal/physical broadcast channel (PBCH) blocks (SSBs) may be used for cell quality measurements. The SSBs may have a longer transmission periodicity than CRS. The SSB periodicity may be configured for 5, 10, 20, 40, 80, 160 milliseconds (ms), and etc. However, the UE may or may not measure cell quality with the same periodicity for multiple SSBs. Note that an SSB may refer to a set of SSBs transmitted repeatedly with a particular carrier frequency, periodicity, and SCS. An appropriate periodicity may be configured based on various channel conditions and network conditions, which may reduce unnecessary measurements and/or reduce power consumption of the UE. As such, SSB-based RRM measurement timing configuration (SMTC) window may be used to configure the UE with the periodicity and timing of the SSBs with which the UE may use for measurements. For example, the SMTC window configuration may support the periodicities of 5, 10, 20, 40, 80, and 160 ms and durations of 1, 2, 3, 4, and 5 ms. The SMTC window may also be set with an offset if the SSBs shift. Thus, to measure an SSB or a set of SSBs, an SMTC window may be configured to the UE with SMTC periodicity, SMTC offset, SMTC duration.

In embodiments, if the UE needs to measure SSBs, a measurement gap (MG) may be configured to the UE so that the UE may not transmit or receive data, or perform some other operations while measuring the SSBs. In NR, an MG length (MGL) may be configured with several different values rather than one fixed length for LTE. Thus, a more adequate MGL can be configured for a particular measurement object (MO) to reduce unnecessary degradation of throughput. For example, the MGL for NR may be configurable to 5.5 ms, 4 ms, 3.5 ms, 3 ms, or 1, ms in additional to the original 6 ms. Note that MO refers to an object that contains measurement configuration, with which the UE may perform measurements. In intra-frequency and inter-frequency measurements, an MO may indicate a frequency/time location and subcarrier spacing (SCS) of a target reference signal to be measured.

Bandwidth Adaptation (BA)

In recent NR RRM and other events, bandwidth part (BWP) has been used to distinguish and/or configure certain frequency range and SCS so that the UE and it serving cell may use it for communications between them. With bandwidth adaptation (BA), the receive and transmit bandwidth of the UE need not be as large as the bandwidth (BW) of the cell and can be adjusted. A subset of the total cell bandwidth of a cell is referred to as a BWP and BA is achieved by configuring the UE with one or more BWP(s) and indicating which of the configured BWPs is currently an active BWP. A BWP may be characterized with a BW and an SCS with which a UE and network establish and perform communications. As an example, a cell BW may be divided into a first BWP with a width of 40 MHz and subcarrier spacing of 15 kHz, a second BWP with a width of 10 MHz and subcarrier spacing of 15 kHz, and a third BWP with a width of 20 MHz and subcarrier spacing of 60 kHz.

When BA is enabled/configured, the UE 105 may acquire system information (SI) on the active BWP. To enable BA on a primary cell (PCell), the AN 110 may configure the UE with uplink (UL) and downlink (DL) BWP(s). To enable BA on secondary cells (SCells) where carrier aggregation (CA) is used, the AN 110 may at least configure the UE with DL BWP(s), and there may be no UL BWP(s) although UL BWP(s) are not precluded. For the PCell, the initial BWP is the BWP used for initial access. For the SCell(s), the initial BWP is the BWP configured for the UE to first operate at SCell activation. In paired spectrum, DL and UL can switch BWP independently. In an unpaired spectrum, DL and UL switch BWP simultaneously. Switching between configured BWPs may occur by means of DCI or inactivity timer. When an inactivity timer is configured for a serving cell, the expiry of the inactivity timer associated to that cell may switch the active BWP to a default BWP configured by the network.

Additionally, the AN 110 may dynamically allocate resources to UEs via the C-RNTI on PDCCH(s) for both DL and UL scheduling assignments. When the UE has enabled DL reception, the UE may monitor the PDCCH(s) in order to find possible DL assignments, and monitor the PDCCH(s) in order to find possible grants for uplink transmission. When CA is configured, the same C-RNTI may apply to all serving cells, at most one configured DL assignment can be signaled per serving cell, and at most one configured UL grant can be signaled per serving cell. In these cases, the UE may only be required to monitor the PDCCH on the one active BWP and not have to monitor PDCCH on the entire DL frequency of the cell. An independent BWP inactivity timer is used to switch the active BWP to the default one. The timer is restarted upon successful PDCCH decoding and the switch to the default BWP takes place when it expires.

When BA is configured, at most one configured DL assignment may be signaled per BWP. On each serving cell, there can be only one configured DL assignment active at a time, and multiple configured DL assignments can be simultaneously active on different serving cells only. Activation and deactivation of configured DL assignments may be independent among the serving cells. Additionally, when BA is configured, at most one configured UL grant can be signaled per BWP. On each serving cell, there may be only one configured UL grant active at a time. A configured UL grant for one serving cell can either be of Type 1 or Type 2. For Type 2, activation and deactivation of configured UL grants may be independent among the serving cells. When supplementary uplink (SUL) is configured, a configured UL grant may only be signaled for one of the 2 ULs of the cell.

To enable reasonable UE battery consumption when BA is configured, only one UL BWP for each uplink carrier and one DL BWP or only one DL/UL BWP pair may be active at a time in an active serving cell, all other BWPs that the UE is configured with being deactivated. On deactivated BWPs, the UE may not monitor the PDCCH, or transmit on PUCCH, PRACH and UL-SCH.

The BWP IE may be used to configure the BWP(s) as discussed above. The network may configure at least an initial BWP for each serving cell comprising at least a DL BWP and one (if the serving cell is configured with an uplink) or two (if using supplementary uplink (SUL)) UL BWP(s). The BWP IE may include individual BWP-Id IEs to refer to corresponding BWPs. The initial BWP is referred to by BWP-Id 0, and the other BWPs are referred to by BWP-Id 1 to maxNrofBWPs. Furthermore, the network may configure additional UL and/or DL BWP(s) for a serving cell. The BWP configuration may be split into UL and DL parameters and into common and dedicated parameters. Common parameters (in BWP-UplinkCommon and BWP-DownlinkCommon) are cell-specific parameters and the network ensures the necessary alignment with corresponding parameters of other UEs. The common parameters of the initial BWP of the PCell may also be provided via SI. For all other serving cells, the network provides the common parameters via dedicated signaling.

When configured, the UE may monitor a set of PDCCH candidates in one or more control resource sets (CORESETS) on the active DL BWP on each activated serving cell according to corresponding search spaces where monitoring implies decoding each PDCCH candidate according to the monitored downlink control information (DCI) formats. A set of PDCCH candidates for the UE to monitor may be defined in terms of PDCCH search spaces. A search space may be a common search space (CSS) or the UE-specific search space (USS or UE-SS). The UE monitors for PDCCH candidates in one or more of the following search spaces:

a Type0-PDCCH CSS for a DCI format with CRC scrambled by a SI-RNTI on a primary cell;
 a Type0A-PDCCH CSS for a DCI format with CRC scrambled by a SI-RNTI on a primary cell;
 a Type1-PDCCH CSS for a DCI format with CRC scrambled by a RA-RNTI, or a TC-RNTI, or a C-RNTI on a primary cell;
 a Type2-PDCCH CSS for a DCI format with CRC scrambled by a P-RNTI on a primary cell;
 a Type3-PDCCH CSS for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s), or SP-CSI-RNTI; and
 a UE-SS for a DCI format with CRC scrambled by C-RNTI, or CS-RNTI(s), or SP-CSI-RNTI.

The UE may be provided with a configuration for a CORESET for Type0-PDCCH CSS by the higher layer parameter RMSI-PDCCH-Config and a subcarrier spacing by the higher layer parameter RMSI-scs for PDCCH reception. The UE may determine the CORESET and the monitoring occasions for Type0-PDCCH CSS. The Type0-PDCCH CSS may be defined by the control channel element (CCE) aggregation levels (ALs) and the number of PDCCH candidates per CCE AL given in Table BWP-1. The CORESET configured for Type0-PDCCH CSS may have CORESET index 0. The Type0-PDCCH CSS may have search space index 0.

For Type0A-PDCCH CSS or for Type2-PDCCH CSS, the CORESET may be same as the CORESET for Type0-PDCCH CSS. The UE may be provided a configuration for Type0A-PDCCH CSS by the higher layer parameter osi-SearchSpace. The CCE ALs and the number of PDCCH candidates per CCE AL may be given in Table BWP-1. If the UE is not provided with the osi-SearchSpace for Type0A-PDCCH CSS, the association between monitoring occasions for Type0A-PDCCH CSS and the SS/PBCH block index may be the same as the association of monitoring occasions for Type0-PDCCH CSS.

The UE may be provided a configuration for Type2-PDCCH CSS by the higher layer parameter paging-SearchSpace. The CCE ALs and the number of PDCCH candidates per CCE AL are given in Table BWP-1. If the UE is not provided with the paging-SearchSpace for Type2-

PDCCH CSS, the association between monitoring occasions for Type2-PDCCH CSS and the SS/PBCH block index may be the same as the association of monitoring occasions for Type0-PDCCH CSS.

For Type1-PDCCH CSS, the UE may be provided with a configuration for a CORESET by the higher layer parameter rach-coreset-configuration and a configuration for a search space by the higher layer parameter ra-SearchSpace. If the rach-coreset-configuration is not provided to the UE, the CORESET for Type1-PDCCH CSS is the same as for Type0-PDCCH CSS. If the UE is not provided with the ra-SearchSpace for Type1-PDCCH CSS, the association between monitoring occasions for Type1-PDCCH CSS and the SS/PBCH block index may be the same as the association of monitoring occasions for Type0-PDCCH CSS.

The UE may assume that the DM-RS antenna port associated with PDCCH reception in the Type0-PDCCH CSS, the Type0A-PDCCH CSS, and the Type2-PDCCH CSS, and for corresponding PDSCH receptions, and the DM-RS antenna port associated with SS/PBCH reception are quasi co-located with respect to delay spread, Doppler spread, Doppler shift, average delay, and spatial Rx parameters. The value for the DM-RS scrambling sequence initialization is the cell ID.

The subcarrier spacing and the CP length for PDCCH reception with Type0A-PDCCH CSS, or Type1-PDCCH CSS, or Type2-PDCCH CSS may be the same as for PDCCH reception with Type0-PDCCH CSS.

The UE may assume that the DM-RS antenna port associated with PDCCH reception and associated PDSCH reception in the Type1-PDCCH CSS are quasi co-located with the SS/PBCH block identified in initial access procedure or with a received CSI-RS with respect to delay spread, Doppler spread, Doppler shift, average delay, and spatial Rx parameters, when applicable.

If a value for the DM-RS scrambling sequence initialization for Type0A-PDCCH CSS, or Type1-PDCCH CSS, or Type2-PDCCH CSS may not be provided by higher layer parameter PDCCH-DMRS-Scrambling-ID in SystemInformationBlockType1, the value may be the cell ID.

When the UE is configured for DL BWP operation, the above configurations for the CSSs may apply for the initial active DL BWP, and the UE may be additionally configured with a CORESET for Type0-PDCCH CSS, Type0A-PDCCH CSS, Type1-PDCCH CSS, or Type2-PDCCH CSS for each configured DL BWP on the PCell, other than the initial active DL BWP.

TABLE BWP-1

CCE ALs and maximum number of PDCCH candidates
per CCE AL for Type0/Type0A/Type2-PDCCH CSS

| CCE AL | Number of Candidates |
| --- | --- |
| 4 | 4 |
| 8 | 2 |
| 16 | 1 |

For each DL BWP configured to the UE in a serving cell, the UE may be provided by higher layer signaling with P CORESETs where P≤3. For CORESET p, 0≤p<P, the higher layer signaling may provide:
  a CORESET index by higher layer parameter CORESET-ID;
  a DM-RS scrambling sequence initialization value by higher layer parameter PDCCH-DMRS-Scrambling-ID;
  a number of consecutive symbols provided by higher layer parameter CORESET-time-duration;
  a set of resource blocks provided by higher layer parameter CORESET-freq-dom;
  a CCE-to-REG mapping provided by higher layer parameter CORESET-CCE-to-REG-mapping-type;
  a REG bundle size, in case of interleaved CCE-to-REG mapping, provided by higher layer parameter CORESET-REG-bundle-size;
  a cyclic shift for the REG bundle interleaver by higher layer parameter CORESET-shift-index;
  an antenna port quasi co-location, from a set of antenna port quasi co-locations provided by higher layer parameter TCI-StatesPDCCH, indicating quasi co-location information of the DM-RS antenna port for PDCCH reception;
  an indication for a presence or absence of a transmission configuration indication (TCI) field for DCI format 1_0 or DCI format 1_1 transmitted by a PDCCH in CORESET p, by higher layer parameter TCI-PresentInDCI.

For each CORESET in a DL BWP of a serving cell, a respective higher layer parameter CORESET-freq-dom may provide a bitmap. The bits of the bitmap may have a one-to-one mapping with non-overlapping groups of 6 physical resource blocks (PRBs), in ascending order of the PRB index in the DL BWP bandwidth of $N_{RB}^{BWP}$ PRBs with starting position $N_{BWP}^{start}$ where the first PRB of the first group of 6 PRBs has index $6 \cdot \lceil N_{BWP}^{start}/6 \rceil$. A group of 6 PRBs may be allocated to a CORESET if a corresponding bit value in the bitmap is 1; else, if a corresponding bit value in the bitmap is 0, the group of 6 PRBs may not be allocated to the CORESET.

If the UE has received initial configuration of more than one TCI states by higher layer parameter TCI-StatesPDCCH containing more than one TCI states but has not received a MAC CE activation for one of the TCI states, the UE may assume that the DM-RS antenna port associated with PDCCH reception in the UE-SS is quasi co-located with the SS/PBCH block the UE identified during the initial access procedure with respect to delay spread, Doppler spread, Doppler shift, average delay, and spatial Rx parameters, when applicable.

If the UE has received higher layer parameter TCI-StatesPDCCH containing a single TCI state, the UE may assume that the DM-RS antenna port associated with PDCCH reception in the UE-SS may be quasi co-located with the one or more DL RS configured by the TCI state.

For each DL BWP of a serving cell where the UE is configured to monitor PDCCH in a search space, the UE may be configured the following by higher layer parameter search-space-config:
  an association between a search space set index s, 0≤s<S, where S≤10, and a CORESET index p;
  for the search space set s in the CORESET p:
  an indication that the search space set is a CSS set or the UE-SS set by higher layer parameter Common-search-space-flag;
  if the search space set s is for a CSS, an indication by higher layer parameter RNTI-monitoring to monitor PDCCH for one or more of DCI format 0_0 and DCI format 1_0 with CRC scrambled by a RNTI from RNTIs, DCI format 2_0, DCI format 2_1, DCI format 2_2, and DCI format 2_3;
  if the search space set s is the UE-SS, an indication by higher layer parameter USS-DCI-format to monitor PDCCH either for DCI format 0_0 and DCI format 1_0, or for DCI format 0_1 and DCI format 1_1;

a number of PDCCH candidates $M_{p,s}^{(L)}$ per CCE AL L by higher layer parameters aggregationLevel1, aggregationLevel2, aggregationLevel4, aggregationLevel8, and aggregationLevel16, for CCE AL 1, CCE AL 2, CCE AL 4, CCE AL 8, and CCE AL 16, respectively;

a PDCCH monitoring periodicity of $k_{p,\ s}$ slots by higher layer parameter monitoringSlotPeriodicityAndOffset;

a PDCCH monitoring offset of $o_{p,\ s}$ slots, where $0 \leq o_{p,s} < k_{p,s}$, by higher layer parameter monitoringSlotPeriodicityAndOffset;

a PDCCH monitoring pattern within a slot, indicating first symbol(s) of the CORESET within a slot for PDCCH monitoring, by higher layer parameter monitoringSymbolsWithinSlot.

If the higher layer parameter monitoringSymbolsWithinSlot indicates to the UE only one PDCCH monitoring occasion within a slot, the UE may not be expected to be configured a corresponding search space sets for a PDCCH subcarrier spacing other than 15 kHz if the CORESET p associated with the search spaces includes at least one symbol after the third slot symbol.

For a subcarrier spacing of 15 KHz, if the higher layer parameter monitoringSymbolsWithinSlot for a search space set s indicates to the UE only one PDCCH monitoring occasion in a slot for a corresponding CORESET p and the CORESET p includes at least one symbol after the third slot symbol, the UE may expect that all CORESETs configured to the UE are located within at most three same consecutive symbols in the slot.

The UE may determine a PDCCH monitoring occasion from the PDCCH monitoring periodicity, the PDCCH monitoring offset, and the PDCCH monitoring pattern within a slot. For search space set s in CORESET p, the UE may determine that a PDCCH monitoring occasion(s) exists in a slot with number $n_{s,f}^{\mu}$ in a frame with number $n_f$ if $(n_f N_{slot}^{frame,\mu} + n_{s,f}^{\mu} - o_{p,s}) \bmod k_{p,s} = 0$.

A PDCCH UE-SS $S_{k_{p,s}}^{(L)}$ at CCE AL L∈{1, 2, 4, 8, 16} may be defined by a set of PDCCH candidates for CCE AL L.

If the UE is configured with higher layer parameter CrossCarrierSchedulingConfig for a serving cell, the carrier indicator field value may correspond to the value indicated by CrossCarrierSchedulingConfig.

For a DL BWP of a serving cell on which the UE monitors PDCCH candidates in the UE-SS, if the UE is not configured with a carrier indicator field, the UE may be to monitor the PDCCH candidates without carrier indicator field. For a serving cell on which the UE monitors PDCCH candidates in the UE-SS, if the UE is configured with a carrier indicator field, the UE may monitor the PDCCH candidates with carrier indicator field.

The UE may not be expected to monitor PDCCH candidates on a DL BWP of a secondary cell if the UE is configured to monitor PDCCH candidates with carrier indicator field corresponding to that secondary cell in another serving cell. For the DL BWP of a serving cell on which the UE monitors PDCCH candidates, the UE may monitor PDCCH candidates at least for the same serving cell.

Table BWP-2 provides the maximum number of PDCCH candidates, $M_{PDCCH}^{max,\ slot}$, across all CCE ALs and across all DCI formats with different size in a same search space that the UE may be expected to monitor per slot and per serving cell as a function of the subcarrier spacing.

TABLE BWP-2

Maximum number of PDCCH candidates per slot and per serving cell as a function of the subcarrier spacing value $2^{\mu} \cdot 15$ kHz, $\mu \in \{0, 1, 2, 3\}$.

| $\mu$ | Maximum number of PDCCH candidates per slot and per serving cell $M_{PDCCH}^{max,\ slot}$ |
|---|---|
| 0 | 44 |
| 1 | 36 |
| 2 | 22 |
| 3 | 20 |

Table BWP-3 provides the maximum number of non-overlapped CCEs, $C_{PDCCH}^{max,\ slot}$, that the UE may be expected to monitor per slot and per serving cell as a function of the subcarrier spacing, if the higher layer parameter Monitoring-symbols-PDCCH-within-slot indicates to the UE only one PDCCH monitoring occasion within a slot. CCEs may not be non-overlapped if the correspond to different CORESET indexes, or different first symbols for the reception of the respective PDCCH candidates.

TABLE BWP-3

Maximum number of non-overlapped CCEs per slot and per serving cell as a function of the subcarrier spacing value $2^{\mu} \cdot 15$ kHz, $\mu \in \{0, 1, 2, 3\}$.

| $\mu$ | Maximum number of non-overlapped CCEs per slot and per serving cell $C_{PDCCH}^{max,\ slot}$ |
|---|---|
| 0 | 56 |
| 1 | 56 |
| 2 | 48 |
| 3 | 32 |

Denote by $S_{css}$ a set of search space set $s_{css}$ for CSSs in a corresponding set $P_{css}$ of CORESETs $p_{css}$ and by $S_{uss}$ a set of search space sets $s_{uss}$ for UE-SSs in a corresponding set $P_{uss}$ of CORESETs $p_{uss}$ where the UE monitors PDCCH candidates in a slot. If $$\sum_{\substack{s_{css} \in S_{css} \\ p_{css} \in P_{css}}} \sum_{L} M_{p_{css},s_{css}}^{(L)} + \sum_{\substack{s_{uss} \in S_{uss} \\ p_{uss} \in P_{uss}}} \sum_{L} M_{p_{uss},s_{uss}}^{(L)} > M_{PDCCH}^{max,slot},$$

the UE monitors $$M_{PDCCH}^{css} = \min\left(M_{PDCCH}^{max,slot}, \sum_{\substack{s_{css} \in S_{css} \\ p_{css} \in P_{css}}} \sum_{L} M_{p_{css},s_{css}}^{(L)}\right)$$

PDCCH candidates for the CSSs and $M_{PDCCH}^{uss} = M_{PDCCH}^{max,\ slot} - M_{PDCCH}^{css}$ PDCCH candidates for UE-SSs in the slot. For a search space set s associated with CORESET p, the CCE indexes for AL L corresponding to PDCCH candidate $m_{s,n_{CI}}$ of the search space set in slot $n_{s,f}^{\mu}$ for a serving cell corresponding to carrier indicator field value $n_{CI}$ are given by $$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p} / L \rfloor \right\} + i$$

Where for any CSS, $Y_{p,n_{s,f}^{\mu}} = 0$; for the UE-SS, $Y_{p,n_{s,f}^{\mu}} = (A_p \cdot Y_{p,n_{s,f}^{\mu}-1}) \bmod D$, $Y_{p,-1} = n_{RNTI} \neq 0$, $A_0 = 39827$, $A_1 = 39829$, $A_2=39839$, and $D=65537$; $i=0, \ldots, L-1$; $N_{CCE,p}$ is the number of CCEs, numbered from 0 to $N_{CCE,p}-1$, in CORESET p; $n_{CI}$ is the carrier indicator field value if the UE is configured with a carrier indicator field by higher layer parameter CrossCarrierSchedulingConfig for the serving cell on which PDCCH is monitored; otherwise, including for any CSS, $n_{CI}=0$; $m_{s,n_{CI}}=0, \ldots, M_{p,s,n_{CI}}^{(L)}-1$, where $M_{p,s,n_{CI}}^{(L)}$ is the number of PDCCH candidates the UE is configured to monitor for AL L for a serving cell corresponding to $n_{CI}$ and a search space set s; for any CSS, $M_{p,s,max}^{(L)}=M_{p,s,0}^{(L)}$; for the UE-SS, $M_{p,s,max}^{(L)}$ is the maximum of $M_{p,s,n_{CI}}^{(L)}$ over all configured $n_{CI}$ values for a CCE AL L of search space set s in CORESET p.

If, for the UE, any CCE index for PDCCH candidate with index $m_{s,n_{CI},2}$ with AL L in CORESET p overlaps with any CCE index for PDCCH candidate with index $m_{s,n_{CI},1}$ with AL L in CORESET p, where $m_{s,n_{CI},1} < m_{s,n_{CI},2}$, the UE may not be expected to monitor the PDCCH candidate with index $m_{s,n_{CI},2}$.

The UE may not be expected to be configured to monitor DCI format 0_1 or DCI format 1_1 in a CSS. The UE that is configured to monitor PDCCH candidates in a serving cell with a DCI format size with carrier indicator field and CRC scrambled by C-RNTI, where the PDCCH candidates may have one or more possible values of carrier indicator field for the DCI format size, may assume that an PDCCH candidate with the DCI format size may be transmitted in the serving cell in any PDCCH UE specific search space corresponding to any of the possible values of carrier indicator field for the DCI format size if the UE includes in UE-NR-Capability an indication for a corresponding capability.

The UE configured with a bandwidth part indicator in DCI formats 0_1 or 1_1 may, in case of an active DL BWP or of an active UL BWP change, determine the DCI information applicable to the new active DL BWP or UL BWP, respectively, as described infra.

For unpaired spectrum operation, if the UE is not configured for PUSCH/PUCCH transmission on serving cell $c_2$, the UE may not be expected to monitor PDCCH on serving cell $c_1$ if the PDCCH overlaps in time with SRS transmission (including any interruption due to uplink or downlink RF retuning time on serving cell $c_2$ and if the UE is not capable of simultaneous reception and transmission on serving cell $c_1$ and serving cell $c_2$.

Bandwidth Part Operation

When the UE is configured for operation in BWPs of a serving cell, the UE may be configured by higher layers for the serving cell with a set of at most four BWPs for receptions by the UE (DL BWP set) in a DL bandwidth by the parameter BWP Downlink and a set of at most four BWPs for transmissions by the UE (UL BWP set) in an UL bandwidth by the parameter BWP-Uplink for the serving cell.

An initial active DL BWP may be defined by a location and number of contiguous PRBs, a subcarrier spacing, and a cyclic prefix, for the control resource set for Type0-PDCCH common search space. For operation on the primary cell or on a secondary cell, a UE may be provided an initial active UL BWP by higher layer parameter initialuplinkBWP. If the UE is configured with a supplementary carrier, the UE may be provided an initial UL BWP on the supplementary carrier by higher layer parameter initialUplinkBWP in supplementaryUplink.

If a UE has dedicated BWP configuration, the UE may be provided by higher layer parameter firstActiveDownlinkBWP-Id a first active DL BWP for receptions and by higher layer parameter firstActiveUplinkBWP-Id a first active UL BWP for transmissions on the primary cell.

For each DL BWP or UL BWP in a set of DL BWPs or UL BWPs, respectively, the UE may be configured the following parameters for the serving cell:

a subcarrier spacing provided by higher layer parameter DL-BWP-mu or UL-BWP-mu or a subcarrier spacing provided by higher layer parameter subcarrierSpacing a cyclic prefix provided by higher layer parameter DL-BWP-CP or UL-BWP-CP or a cyclic prefix provided by higher layer parameter cyclicPrefix;

a PRB offset with respect to the PRB determined by higher layer parameters offset-pointA-low-scs and ref-scs and a number of contiguous PRBs provided by higher layer parameter DL-BWP-BW or UL-BWP-BW or a first PRB and a number of contiguous PRBs indicated by higher layer parameter locationAndBandwidth that is interpreted as RIV, setting $N_{BWP}^{size}=275$, and the first PRB is a PRB offset relative to the PRB indicated by higher layer parameters offsetToCarrier and subcarrierSpacing;

an index in the set of DL BWPs or UL BWPs by respective higher layer parameters DL-BWP-index or UL-BWP-index or an index in the set of DL BWPs or UL BWPs by respective higher layer parameter bwp-Id;

a set of BWP-common and a set of BWP-dedicated parameters by higher layer parameters bwp-Common and bwp-Dedicated; and/or DCI format 1_0 or DCI format 1_1 detection to a PDSCH reception timing values by higher layer parameter DL-data-time-domain, PDSCH reception to a HARQ-ACK transmission timing values by higher layer parameter DL-data-DL-acknowledgement, and DCI format 0_0 or DCI format 0_1 detection to a PUSCH transmission timing values by higher layer parameter UL-data-time-domain.

For unpaired spectrum operation, a DL BWP from the set of configured DL BWPs with index provided by higher layer parameter bwp-Id for the DL BWP may be linked with an UL BWP from the set of configured UL BWPs with index provided by higher layer parameter bwp-Id for the UL BWP when the DL BWP index and the UL BWP index are equal. For unpaired spectrum operation, a UE may not expect to receive a configuration where the center frequency for a DL BWP is different than the center frequency for an UL BWP when the bwp-Id of the DL BWP is equal to the bwp-Id of the UL BWP.

For each DL BWP in a set of DL BWPs on the primary cell, a UE may be configured control resource sets for every type of common search space and for UE-specific search space. The UE may not expect to be configured without a common search space on the PCell, or on the PSCell, in the active DL BWP.

For each UL BWP in a set of UL BWPs, the UE may be configured resource sets for PUCCH transmissions. The UE may receive PDCCH and PDSCH in a DL BWP according to a configured subcarrier spacing and CP length for the DL BWP. The UE may transmit PUCCH and PUSCH in an UL BWP according to a configured subcarrier spacing and CP length for the UL BWP.

If a BWP indicator field is configured in DCI format 1_1, the BWP indicator field value may indicate the active DL BWP, from the configured DL BWP set, for DL receptions. If a BWP indicator field is configured in DCI format 0_1, the BWP indicator field value may indicate the active UL BWP, from the configured UL BWP set, for UL transmissions. If a BWP indicator field is configured in DCI format 0_1 or DCI format 1_1 and indicates an UL BWP or a DL BWP different from the active UL BWP or DL BWP, respectively, the UE may:

for each information field in the received DCI format 0_1 or DCI format 1_1;

if the size of the information field is smaller than the one required for the DCI format 0_1 or DCI format 1_1 interpretation for the UL BWP or DL BWP that is indicated by the bandwidth part indicator, respectively, the UE prepends zeros to the information field until its size is the one required for the interpretation of the information field for the UL BWP or DL BWP prior to interpreting the DCI format 0_1 or DCI format 1_1 information fields, respectively;

if the size of the information field is larger than the one required for the DCI format 0_1 or DCI format 1_1 interpretation for the UL BWP or DL BWP that is indicated by the bandwidth part indicator, respectively, the UE uses a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively; and/or set the active UL BWP or DL BWP to the UL BWP or DL BWP indicated by the bandwidth part indicator in the DCI format 0_1 or DCI format 1_1, respectively.

A UE may expect to detect a DCI format 0_1 indicating active UL BWP change, or a DCI format 1_1 indicating active DL BWP change, only if a corresponding PDCCH is received within the first 3 symbols of a slot.

For the primary cell, the UE may be provided by higher layer parameter defaultDownlinkBWP-Id a default DL BWP among the configured DL BWPs. If the UE is not provided a default DL BWP by higher layer parameter defaultDownlinkBWP-Id, the default DL BWP may be the initial active DL BWP.

If the UE is configured for a secondary cell with higher layer parameter defaultDownlinkBWP-Id indicating a default DL BWP among the configured DL BWPs and the UE may be configured with higher layer parameter bwp-InactivityTimer indicating a timer value, the UE procedures on the secondary cell may be the same as on the primary cell using the timer value for the secondary cell and the default DL BWP for the secondary cell.

If the UE is configured by higher layer parameter bwp-InactivityTimer a timer value for the primary cell and the timer is running, the UE may increment the timer every interval of 1 millisecond for frequency range 1 or every 0.5 milliseconds for frequency range 2 if the UE does not detect a DCI format for PDSCH reception on the primary cell for paired spectrum operation or if the UE does not detect a DCI format for PDSCH reception or a DCI format for PUSCH transmission on the primary cell for unpaired spectrum operation during the interval, in accordance with 3GPP TS 38.321, v15.2.0 (Jun. 20, 2018).

If the UE is configured by higher layer parameter BWP-InactivityTimer for a timer value for a secondary cell and the timer is running, the UE may increment the timer every interval of 1 millisecond for frequency range 1 or every 0.5 milliseconds for frequency range 2 if the UE does not detect a DCI format for PDSCH reception on the secondary cell for paired spectrum operation or if the UE does not detect a DCI format for PDSCH reception or a DCI format for PUSCH transmission on the secondary cell for unpaired spectrum operation during the interval. The UE may deactivate the secondary cell when the timer expires.

If the UE is configured by higher layer parameter firstActiveDownlinkBWP-Id that is a first active DL BWP and by higher layer parameter firstActiveUplinkBWP-Id a first active UL BWP on a secondary cell or supplementary carrier, the UE may use the indicated DL BWP and the indicated UL BWP on the secondary cell as the respective first active DL BWP and first active UL BWP on the secondary cell or supplementary carrier.

For paired spectrum operation, the UE may not be expected to transmit HARQ-ACK information on a PUCCH resource indicated by a DCI format 1_0 or a DCI format 1_1 if the UE changes its active UL BWP on the PCell between a time of a detection of the DCI format 1_0 or the DCI format 1_1 and a time of a corresponding HARQ-ACK information transmission on the PUCCH. The UE may also not be expected to monitor PDCCH when the UE performs RRM measurements over a bandwidth that is not within the active DL BWP for the UE.

Figure 4:
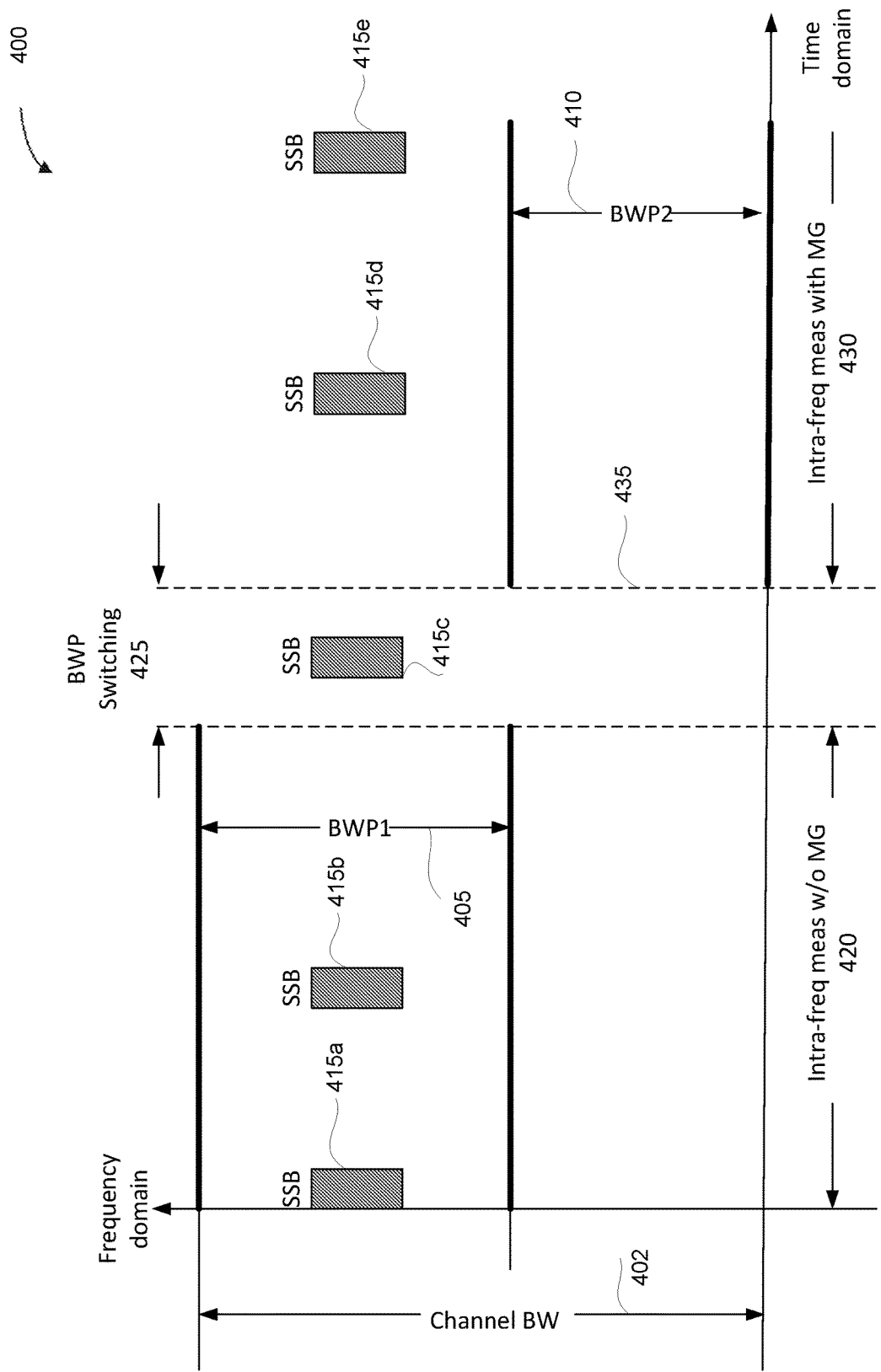
FIG. 4 illustrates an example of switching BWPs during an intra-frequency measurement that is illustrated in both time domain and frequency domain, in accordance with various embodiments.

FIG. 4 illustrates an example of switching BWPs during an intra-frequency measurement 400 that is illustrated in both time domain and frequency domain, in accordance with various embodiments. The UE operates within a channel BW 402 in this example, and there are two BWPs shown as BWP1 410 and BWP2 415 in the channel BW 402. While the UE 105 operates in BWP1 405 as its active BWP with its serving cell in the network, the UE 105 may need to perform an intra-frequency measurement of one or more SSBs 415a/b/c/d/e. The SSBs 415 may be from the serving cell or a target cell, or a combination thereof, in the network.

In a conventional intra-frequency measurement, the UE 105 may operate at a carrier frequency and SCS in a channel BW with respect to the serving cell and one or more SSBs, which are transmitted by the same serving cell or a target cell, may be transmitted at the same carrier frequency and SCS. Thus, the UE 105 may not need an MG to perform the measurement of the one or more SSBs, since the UE may operate at the same carrier frequency and SCS to process data while performing the SSB measurement. However, with the introduction of BWP, the UE may operate in a BWP while is requested to measure SSBs in another BWP in the same channel BW. For the example descriptions herein, the SSBs may be located in one BWP, which is referred to as an initial BWP. Thus, an MG may be needed in an intra-frequency measurement when an active BWP BWP is not overlapping with the initial BWP, in which the SSB is located.

FIG. 4 illustrates an intra-frequency measurement of SSBs 415a and 415b without an MG because the UE 105 can perform both the measurement and data processing that includes data transmission, reception, etc., during an intra-frequency measurement without MG 420. In this case, the BWP1 405 is an active and initial BWP. Then, if a BWP switching 425 occurs during the intra-frequency measurement, the active BWP may be switched from BWP1 405 to BWP2 410. In this example, the UE may operate within either BWP1 405 or BWP410. Once the UE 105 does not have BWP1 as the active BWP while the SSBs 415c/d/e are still in the BWP1 405, the UE 105 may need an MG to measure SSBs 415c/d/e, because the UE 105 may not be able to operate in BWP1 and BWP2 simultaneously. Accordingly, an MG may be configured and used by the UE for an intra-frequency measurement with MG 430. However, to configure an MG may require relatively longer time than BWP switching, since the MG may be configured via RRC signaling while the BWP switching may be configured via downlink channel indication (DCI) signaling. Thus, the MG may not be configured and in use until a time point 435. This may cause interrupted intra-frequency measurement and one or more SSBs may not be measured, e.g., SSB 415c as illustrated in FIG. 4. Meanwhile, configuring, reconfiguring, or de-configuring MG by the AN 110 to the UE 105 may also cause performance degradation and throughput loss between the UE 105 and the network. One existing approach is to configure the UE 105 with an MG in all intra-frequency measurements regardless active BWP or BWP switching. This approach may not miss SSBs to measure or cause MG rescheduling overhead. However, the UE 105 may not process data during the configured MG in use, even when the UE 105 may not need one, which may cause more inefficiency in throughput performance.

Figure 5:
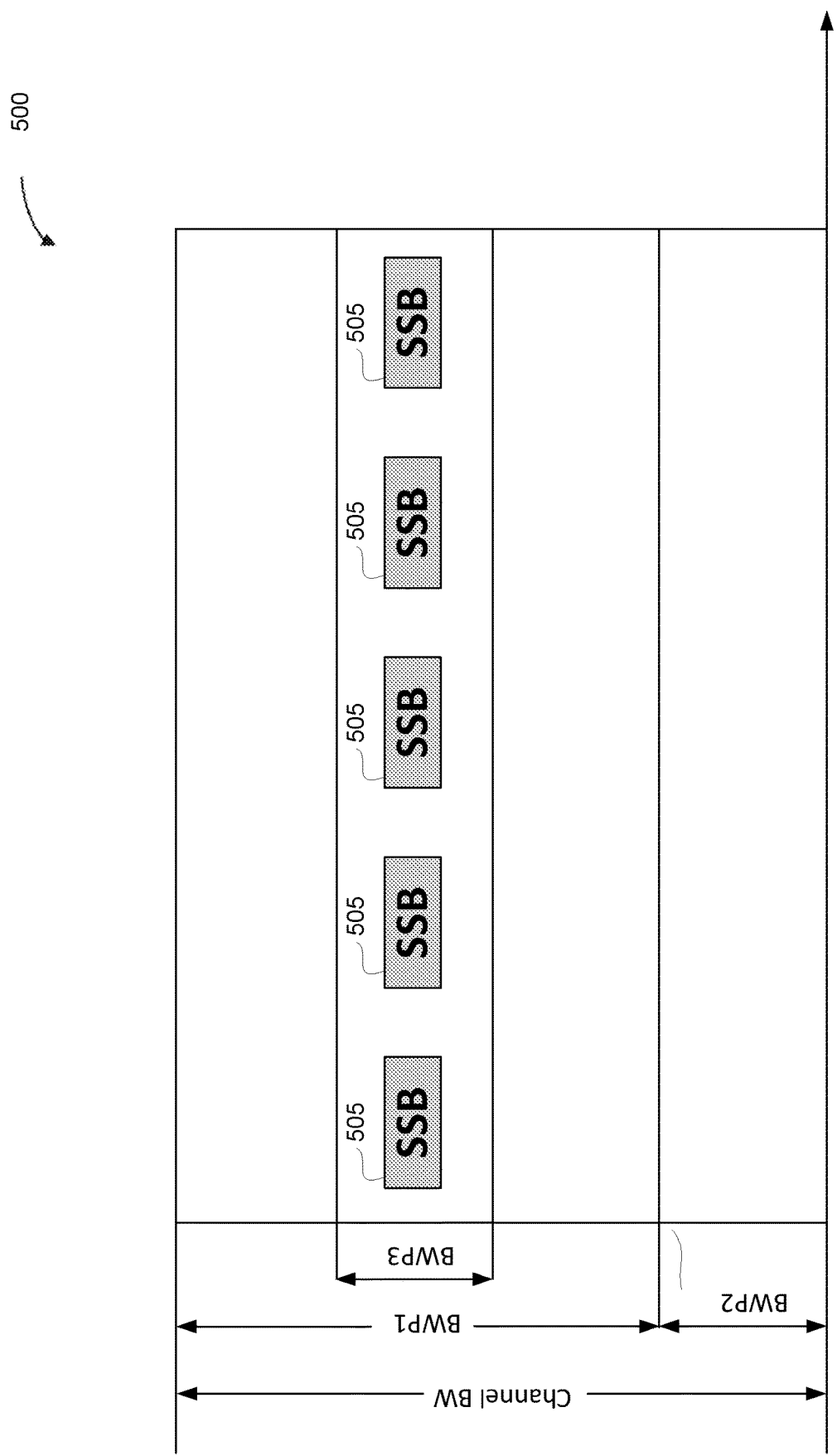
FIG. 5 illustrates an example SSB-based intra-frequency measurement in a channel with multiple BWPs, in accordance with various embodiments.

FIG. 5 illustrates an example SSB-based intra-frequency measurement 500 in a channel BW with multiple BWPs, in accordance with various embodiments. In embodiments, the UE 105 may be configured with a number of BWPs. For example, the UE may be configured with BWP1, 2, and 3. The configuration of one or more BWPs may be configured during a BWP configuration described earlier. In this example, BWP3 is overlapped by the BWP1 and BWP1 has a broader BW. It is assumed that BWP1 and BWP3 have the same SCS. Meanwhile, BWP2 occupies a different frequency range and it may have the same or a different SCS from the BWP1 and BWP3. FIG. 5 illustrates a series of SSBs 505 transmitted in BWP1 as an initial BWP of the UE 105. A single series of SSBs from a serving cell is illustrated throughout this disclosure, but more than one series of SSBs may be used in a serving cell. Some or all of the embodiments herein may apply as well as multiple series SSBs. A series of SSBs refers to one or more SSBs characterized in the same BWP with the same frequency and SCS from the same cell, and may be referred to as an SSB due to those reasons. The terms "series of SSBs" and "SSB" are used interchangeably in this disclosure, unless otherwise indicated. Note that in FIG. 5, the initial BWP is BWP1 and only the initial BWP may contain SSB 505. However, the SSB 505 may be transmitted in another BWP, and some or all of the approaches are applicable as well.

In embodiments, the UE 105 may be configured with BWP1 as an active BWP initially. An MG may be configured initially for measuring the SSB 505 but not activated or used by the UE 105 for measurements until needed. Thus, a configured MG may not be in use by the UE 105 unless the MG is activated by the UE 105 under certain conditions. In this scenario, the UE 105 may not need the MG to measure the SSB 505 since the SSB 505 is in BWP1 and the active BWP is BWP1 as well. In accordance, the UE 105 may deactivate the configured MG, since it does not need the MG. In another scenario, if the UE 105 is configured with BWP switching, the UE 105 may determine to activate or not to activate the configured MG based on detailed information of the BWP switching. For example, if the UE 105 is configured to switch from BWP1 to BWP3, the UE 105 may not activate the MG since BWP1 and BWP3 share the same SCS and carrier frequency. But if BWP3 operates at a different SCS, the UE 105 may need the MG even the carrier frequencies of BWP1 and BWP3 are the same. Thus, the UE 105 may activate or not activate the configured MG accordingly.

In another scenario, if the UE 105 is configured with a BWP switching from BWP1 to BWP2, the UE 105 may need the MG since BWP1 and BWP2 do not share the same carrier frequency, regardless whether the SCSs of the two BWPs. Thus, the UE 105 may activate the configured MG accordingly. Continuing with this scenario, the MG now is activated while the active BWP is BWP2 and SSB is in BWP1. If the UE 105 is configured to switch back to BWP1 from BWP2, the UE 105 may not need the MG any more once the active BWP is BWP1 again. Thus, the UE 105 may then determine to deactivate the activated MG.

In the above embodiments, the AN 110 may configure the MG via an information element (IE) via RRC signaling or other like signaling. The initial BWP configuration may be configured along with the MG configuration or in a separate IE. A UE 105 may be indicated by the AN 110 that it may be granted with a capability of determining activation and deactivation of the configured MG. There may be multiple approaches for the UE 105 to activate, not to activate, or deactivate a configured MG, via various signaling approaches in NR. Below are some non-exclusive and non-limiting examples in implementations in this regard.

In embodiments, the UE 105 may be configured with an capability of MG activation or deactivation based on BWP. This capability may be configured in a measurement gap IE (MeasGapConfig), which may be the same as or substantially similar to the MeasGapConfig IE defined in 3GPP TS 38.331 v15.2.1 (Jun. 21, 2018). The capability may be indicated in "gapActivationPerBWP" in the IE, as shown as below in bold:

| MeasGapConfig information element |
| --- |
| -- ASN1START |
| --TAG-MEAS-GAP-CONFIG-START |
| MeasGapConfig ::=           SEQUENCE { |
|   gapFR2                    SetupRelease { GapConfig |
| }                                                OPTIONAL,          -- Need M |
| ..., |
| [[ |
|   gapFR1                    SetupRelease { GapConfig |
| }                                                OPTIONAL,          -- Need M |
|   gapUE                     SetupRelease { GapConfig |
| }                                                OPTIONAL -- Need M |
| ]] |
| } |
| GapConfig ::=               SEQUENCE { |
|   gapOffset                 INTEGER (0..159), |
|   mgl                       ENUMERATED {ms1dot5, ms3, ms3dot5, ms4, ms5dot5, ms6}, |
|   mgrp                      ENUMERATED {ms20, ms40, ms80, ms160}, |
|   mgta                      ENUMERATED {ms0, ms0dot25, ms0dot5}, |
| ... |

| MeasGapConfig information element |
| --- |
| gapActivationPerBWP_List-r16  SEQUENCE (SIZE (1 .. maxNrofBWPs)) OF<br>GapActivationPerBWP  ,OPTIONAL<br>}<br>GapActivationPerBWP ::=  SEQUENCE {<br>   bwp-Id  BWP-Id,<br>   gapActivate  ENUMERATED {TRUE}<br>}<br>-- TAG-MEAS-GAP-CONFIG-STOP<br>-- ASN1STOP |

| MeasGapConfig field descriptions |
| --- |
| gapActivativationPerBWP<br>Indicates whether the UE activate the measurement gap when the associated BWP ID is the active BWP.<br>gapActivate<br>Value true indicates the UE activate the measurement gap when the active BWP is the same as the bwp-Id. Otherwise the UE will deactivate or not activate the measurement gap. |

In the above example of MeasGapConfig IE, the "bwp-Id" may indicate a BWP that is configured to be active for the UE 105. If the "gapActivate" is indicated with a "true" value, the UE 105 may activate the configured MG if the active BWP is the same as the BWP indicated by the "bwp-Id," since the SSB 505 is transmitted only in the initial BWP, which is different from the active BWP in this case. Otherwise, the UE 105 may deactivate the MG or not activate if the MG has not been activated earlier. In some embodiments, the IE may also indicate one or more BWPs with which the MG per BWP can be activated or deactivated by the UE 105. The IE may further indicate one or more BWP-IDs corresponding to the one or more BWPs.

In some embodiments, a BWP may be configured and/or activated to the UE 105 via a BWP-downlink IE, which may be the same as or substantially similar to the BWP-downlink IE defined in TS 38.331. This activation/deactivation capability with respect to a particular downlink (DL) BWP may be indicated in "gapActivate" in the IE, as shown as below in bold:

| BWP-Downlink information element |
| --- |
| -- ASN1START<br>-- TAG-BWP-DOWNLINK-START<br>BWP-Downlink ::=  SEQUENCE {<br>  bwp-Id  BWP-Id,<br>  bwp-Common  BWP-<br>DownlinkCommon  OPTIONAL,  -- Cond<br>SetupOtherBWP<br>  bwp-Dedicated  BWP-<br>DownlinkDedicated  OPTIONAL,  -- Need M<br>  ...,<br>  gapActivate  ENUMERATED {TRUE}  OPTIONAL<br>}<br>-- TAG-BWP-DOWNLINK-STOP<br>-- ASN1STOP |

In the above BWP-downlink IE, the IE may be used to indicate an additional DL BWP to be active other than the initial BWP. Thus, the "bwp-Id" may have a value other than zero. In this scenario, the MG may be activated by the UE 105 because the configured active BWP that is indicated by the "bwp-Id" is different from the initial BWP, which contains the SSB 505. The MG may not be activated in some exceptions, when the active BWP share the same carrier frequency and SCS with the initial BWP.

In embodiments, if the MG has been activated due to prior BWP switching, the UE 105 may keep the MG activated or deactivate the MG depending on the new active BWP. For example, if the new active BWP is the same as the initial BWP, or at least shares the same carrier frequency and SCS with the initial BWP, the UE 105 may deactivate the MG upon the indication of the new active BWP. On the contrary, if the new active BWP is different from the initial BWP, or does not share either the carrier frequency or SCS of the initial BWP, the UE 105 may keep the MG activated since it still needs the MG to measure the SSB in the initial BWP.

In some embodiments, if more than one MG are to be configured to the UE 105, each of the configured MGs may be determined to be activated, not activated, or deactivated if already being activated. The UE 105 may determine to activate, not to activate, or deactivate based on respective indications from one or more IEs configured by the AN 110. Similarly to the scenario with single MG, the each of the configured MGs may be activated or not based on the active BWP and the initial BWP. In this approach, similar gapActivationPerBWP may be used for each configured MG. The capability may be indicated in "gapActivationPerBWP" in the IE, as shown as below in bold. Inside the bold rectangular, three different MGs are illustrated as multiple MGs.

| MeasGapConfig information element |
| --- |

```
-- ASN1START
-- TAG-MEAS-GAP-CONFIG-START
MeasGapConfig ::=          SEQUENCE {
    gapFR2                     SetupRelease { GapConfig }
                OPTIONAL,    -- Need M
    ...,
    [[
    gapFR1                     SetupRelease { GapConfig }
                OPTIONAL,    -- Need M
    gapUE                      SetupRelease { GapConfig }
                OPTIONAL,    -- Need M
    ]]

[[
        multiGapUE-r16     SetupRelease {
                            SEQUENCE (SIZE (1..maxNoGap)) OF GapConfig}
                                    OPTIONAL,    -- Need M
    }
        multiFR1-r16       SetupRelease {
                            SEQUENCE (SIZE (1..maxNoGap)) OF GapConfig}
                                    OPTIONAL,    -- Need M
    }
        multiFR2-r16       SetupRelease {

SEQUENCE (SIZE (1..maxNoGap)) OF GapConfig}
                                    OPTIONAL,    -- Need M
    }
    ]]
}
GapConfig ::=              SEQUENCE {
    gapOFFSET                  INTEGER (0..159),
    mgl                        ENUMERATED {ms1dot5, ms3, ms3dot5, ms4, ms5dot5,
ms6}
    mgrp                       ENUMERATED [ms20, ms40, ms80, ms160},
    mgta                       ENUMERATED {ms0, ms0dot25, ms0dot5}
    ...
    gapActivationPerBWP_List-r16 SEQUENCE (SIZE (1..maxNrofBWPs)) OF
    GapActivationPerBWP        ,OPTIONAL
}
GapActivationPerBWP ::=    SEQUENCE {
    bwp-Id                     BWP-Id,
    gapActivate                ENUMERATED {TRUE}
}
-- TAG-MEAS-GAP-CONFIG-SEOP
-- ASN1STOP
```

| MeasGapConfig field descriptions |
| --- |
| gapActivativationPerBWP<br>Indicates whether the UE activate the measurement gap when the associated BWP ID is the active BWP.<br>gapActivate<br>Value true indicates the UE activate the measurement gap when the active BWP is the same as the bwp-Id. Otherwise the UE will deactivate the measurement gap. Indicates the measurement gap. |

In some embodiments, a BWP may be configured and/or activated to the UE 105 via a BWP-downlink IE, which may be the same as or substantially similar to the BWP-downlink IE defined in TS 38.331. This activation/deactivation capability with respect to a particular downlink (DL) BWP may be indicated in "gapIdActivate" in the IE, as shown as below in bold:

| BWP-Downlink information element |
| --- |

```
-- ASN1START
-- TAG-BWP-DOWNLINK-START
BWP-Downlink ::=           SEQUENCE {
    bwp-Id                     BWP-Id,
    bwp-Common                 BWP-
```

-continued

| BWP-Downlink information element |
|---|

```
DownlinkCommon                         OPTIONAL,    -- Cond
SetupOtherBWP
  bwp-Dedicated                BWP-
DownlinkDedicated                      OPTIONAL,    -- Need M
  ...,
  gapIdActivate                SEQUENCE (SIZE (1..maxNoGap)) OF INTEGER
(0..maxNoGap)     OPTIONAL
}
-- TAG-BWP-DOWNLINK-STOP
-- ASN1STOP
```

In the above BWP-downlink IE, the IE may be used to indicate an additional DL BWP to be active other than the initial BWP. Thus, the "bwp-Id" may have a value other than zero. In embodiments, more than one MGs may be configured to the UE 105 and the IE may indicate a number of the MGs and/or each of the MGs. Since there are more than one MG, each of them needs to be indicated. In one option, am MG identification (ID) may be used to indicate which one of the configured MGs is to be activated, refrained from activation, deactivated, or activated as no change from earlier. The action regarding the MG ID may be indicated within a BWP configuration.

In another option without MG ID, a list of configured MGs in order may be provided to the UE 105. A bit string may be used to indicate which MG is activated. The list may include, but is not limited to, perUE gap, perFR gap, per FR1 gap, and per FR2 gap. For example, if a list includes per UE gap, per FR1 gap, and per FR2 gap in order, a bit string "011" may indicate that the per FR1 and per FR2 gaps are to be activated or kept in activation, and the per UE gap is to be deactivated or not activated. In anther option, a "gapActivate" within each BWP may be used to enable or disable all of the configured per UE MGs, per FR1 MGs, or per FR2 gap MGs when the active BWP is with in that BWP.

FIG. 6A illustrates an operation flow/algorithmic structure 600 to facilitate a process of configuring and utilizing MG based on BWP in intra-frequency measurements from a UE perspective, in accordance with various embodiments. The operation flow/algorithmic structure 600 may be performed by the UE 105 or circuitry thereof.

The operation flow/algorithmic structure 600 may include, at 610, decoding, upon reception of a message from an AN, an IE that is to indicate an active BWP and a MG based on the active BWP. This IE may be an MG configuration (MeasGapConfig) IE, which is the same as or substantially similar to the MeasGapConfig IE, or a BWP downlink IE (BWP-Downlink) that are defined in TS 38.331.

In embodiments, if the IE is a MeasGapConfig IE, the IE may include information to indicate one or more BWPs are available for activation/deactivation of a configured MGs. The MG may be configured as an MG per BWP. The MG per BWP may be configured to the UE for an intra-frequency measurement in an initial BWP. The initial BWP is where an SSB or a set of SSBs are located for intra-frequency measurement. The IE may further indicate an active BWP, to which the UE is configured to switch during the intra-frequency measurement. The IE may indicate the active BWP by an BWP (identification) ID or like references. Then, the MG per BWP may be activated or not activated, or deactivated if it has been activated earlier, based on a comparison or determination between the active BWP and the initial BWP. Further information regarding the MeasGapConfig IE are described with respect to the examples of MeaGapConfig information element.

In embodiments, if the IE is a BWP-Downlink IE, the IE may include information to indicate an active downlink (DL) BWP for UE to activate and that MG per BWP is available for this BWP. Thus, the UE may determine to activate, not activate, deactivate, or not deactivate the MG, based on the active DL BWP and the initial BWP.

In embodiments, the MG may be configured to the UE by the AN via the MeasGapConfig IE or another like IE. IF multiple MGs are supported by the UE, more than one MG may be configured to the UE via the MeasGapConfig IE or another like IE.

The operation flow/algorithmic structure 600 may further include, at 620, activating, refraining from activating, deactivating, or refraining from deactivating, the MG with respect to a measurement of an SSB in an initial BWP, based on the active BWP and the initial BWP. The UE may determine to activate, not to activate, to deactivate, or not to deactivate, the MG by comparing the newly active or to-be active BWP (hereinafter "active BWP") with the initial BWP that carries the SSB.

In embodiments, if the active BWP is the same as the initial BWP, or the two BWPs share the same carrier frequency and SCS, the MG may not be activated, or the MG may be deactivated if it has been activated and in use prior to the new active BWP. This is because the UE may be able to measure the SSB and process data (e.g., transmit or receive data) in the same BWP, which is the initial BWP in this case. Otherwise, if the active BWP is different from the initial BWP, or the two BWPs do not share either carrier frequency or SCS, or both, the MG may be activated, or the MG may not be deactivated if it has not been in use prior to the new active BWP. This is because the UE may not be able to operate in two BWPs simultaneously.

In embodiments, if multiple MGs are supported by the UE and more than one MG are configured to the UE. The UE may act to activate, not to activate, to deactivate, or not to deactivate, the MGs respectively.

The operation flow/algorithmic structure 600 may further include, at 630, measuring the SSB in the initial BWP during the intra-frequency measurement with or without the MG, based on the activation, no activation, deactivation, or deactivation of the MG. Once the MG is set to be in use or not in use for the SSB measurement, the UE may measure the SSB accordingly. For example, if the MG is in use, the UE may not, or not be expected to, process data in the active BWP during SSB measurement period. Otherwise, if the MG is not in use, the UE may measure the SSB while processing data with the serving cell either in the active BWP. To operate in either the initial BWP or the active BWP, the UE may need to tune its receiver and/or transmitter to operate in the specific BWP. The tuning may include, but is not limited to, tuning operating frequency, SCS, and operating BW.

FIG. 6B illustrates an operation flow/algorithmic structure 605 to facilitate the process of configuring and utilizing MG based on BWP in intra-frequency measurements from an AN perspective, in accordance with various embodiments. The operation flow/algorithmic structure 605 may be performed by the AN 110 or circuitry thereof.

The operation flow/algorithmic structure 605 may include, at 615, generating an IE of MG configuration (MeasGapConfig) or BWP downlink that is to indicate an activation of an MG based on an active bandwidth part (BWP). The IE may indicate how to use the configured MG, such as, to activate, not to activate, to deactivate, or not to deactivate, the MG based on the initial BWP and the active BWP. The IE may indicate a capability for the UE to determine whether to activate, not to activate, to deactivate, or not to deactivate, the MG.

In embodiments, when multiple MGs are supported by the UE and more than one MG are configured to the UE, the IE may indicate an activation, a deactivation, a refrain from activation or deactivation with each configured MG. Additionally or alternatively, the IE may indicate the action or non-action to MG activation/deactivation by indicating a group or a list of the configured MGs. The MGs may be grouped by their characteristics, such as per UE MG, per FR1 MG, Per FR2 MG, and other available types of MGs.

The operation flow/algorithmic structure 605 may further include, at 625, transmitting the IE to a UE via radio resource control (RRC) signaling. The AN may transmit the IE or a message that includes the IE to the UE for the intra-frequency measurement.

In some embodiments, the AN may generate a configuration message that configures a BWP switch to the UE during the intra-frequency measurement. The configuration message may include the BWP-Downlink IE or a different IE. The configuration message may be transmitted to the UE via DCI, which may be relatively faster than MG configuration via RRC.

In some embodiments, the AN may also generate and transmit the SSB in the initial BWP for the intra-frequency measurement.

Figure 7:
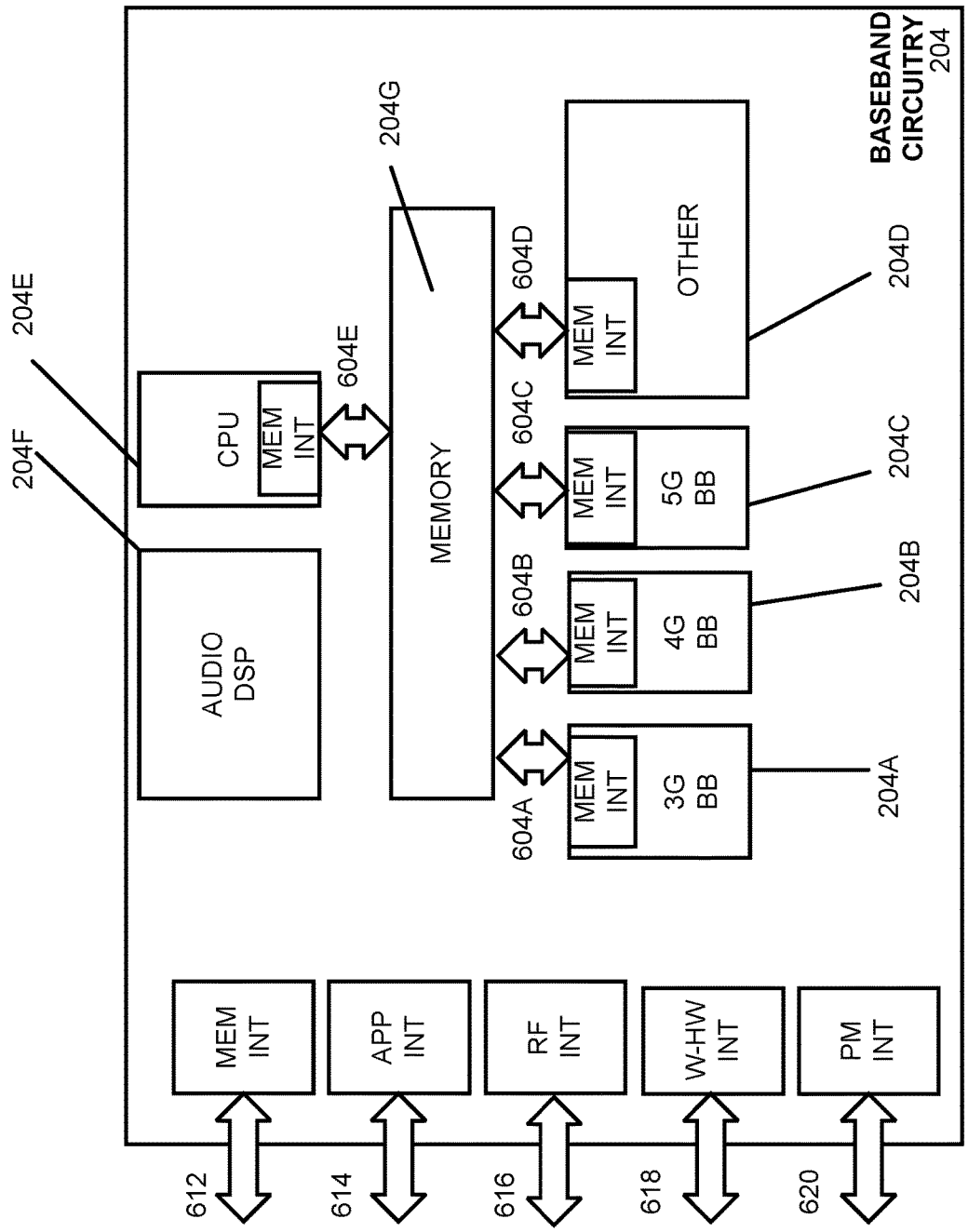
FIG. 7 illustrates example interfaces of baseband circuitry in accordance with some embodiments.

FIG. 7 illustrates example interfaces of baseband circuitry in accordance with some embodiments. As discussed above, the baseband circuitry 204 of FIG. 2 may comprise processors 204A-204E and a memory 204G utilized by said processors. The processors 204A-204E of the UE 105 may perform some or all of the operation flow/algorithmic structure 600, in accordance with various embodiments with respect to FIGS. 5A and 5B. The processors 204A-204E of the AN 110 may perform some or all of the operation flow/algorithmic structure 605, in accordance with various embodiments with respect to FIGS. 5A and 5B. Each of the processors 204A-204E may include a memory interface, 704A-704E, respectively, to send/receive data to/from the memory 204G. The processors 204A-204E of the UE 105 may be used to process the SFTD measurement; the processors 204A-204E of the AN 110 may be used to generate the SFTD measurement configuration.

The baseband circuitry 204 may further include one or more interfaces to communicatively couple to other circuitries/devices, such as a memory interface 712 (e.g., an interface to send/receive data to/from memory external to the baseband circuitry 204), an application circuitry interface 714 (for example, an interface to send/receive data to/from the application circuitry 202 of FIG. 2), an RF circuitry interface 716 (for example, an interface to send/receive data to/from RF circuitry 206 of FIG. 2), a wireless hardware connectivity interface 718 (for example, an interface to send/receive data to/from Near Field Communication (NFC) components, Bluetooth® components (for example, Bluetooth® Low Energy), Wi-Fi® components, and other communication components), and a power management interface 720 (for example, an interface to send/receive power or control signals).

Figure 8:
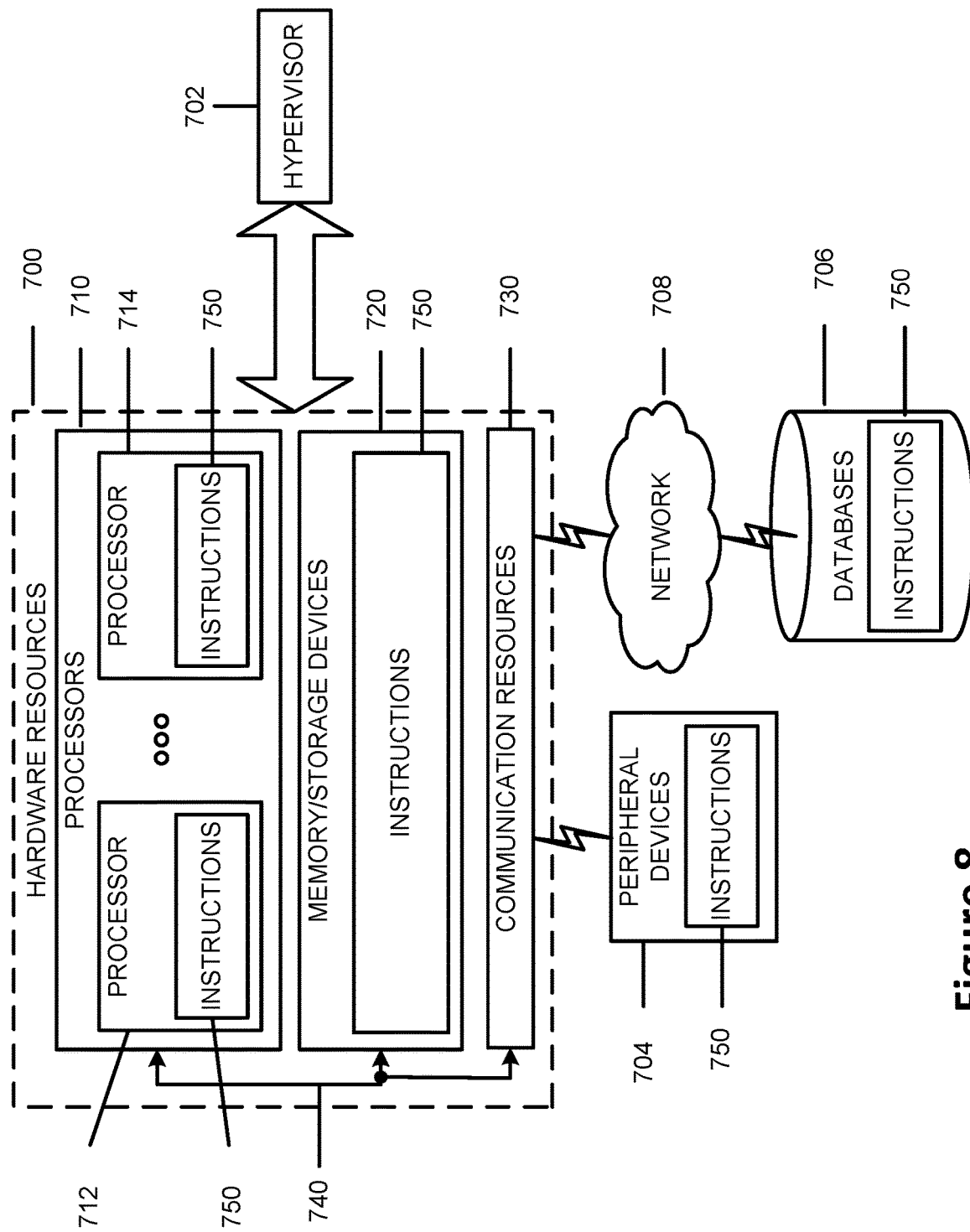
FIG. 8 illustrates hardware resources in accordance with some embodiments.

FIG. 8 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (for example, network function virtualization (NFV)) is utilized, a hypervisor 802 may be executed to provide an execution environment for one or more network slices/sub-slices to utilize the hardware resources 800.

The processors 810 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein, e.g., the operation flows 600 and 605. For example, in an embodiment in which the hardware resources 800 are implemented into the UE 105, the instructions 850 may cause the UE to perform some or all of the operation flow/algorithmic structure 600. In other embodiments, the hardware resources 800 may be implemented into the AN 110. The instructions 850 may cause the AN 110 to perform some or all of the operation flow/algorithmic structure 605. The instructions 850 may reside, completely or partially, within at least one of the processors 810 (for example, within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Some non-limiting Examples of various embodiments are provided below.

Example 1 may include a method comprising: decoding or causing to decode, upon reception of a message from an AN, an IE that is to indicate an active BWP and an MG based on the active BWP; activating or causing to activate, refraining or causing to refrain from activating, deactivating or causing to deactivate, or refraining or causing to refrain from deactivating, the MG with respect to a measurement of a synchronization signal block (SSB) in a BWP, based on the active BWP and the BWP with SSB; and measuring or causing to measure the SSB in the BWP with SSB during an intra-frequency measurement with or without the MG, based on the activation, no activation, deactivation, or deactivation of the MG.

Example 1A may include the method of example 1 and/or some other examples herein, wherein the BWP with SSB is an initial BWP of the UE.

Example 2 may include the method of example 1 and/or some other examples herein, wherein to activate or refrain from deactivating the MG is to determine that the active BWP is different from the BWP with SSB.

Example 3 may include the method of example 1 and/or some other examples herein, wherein to activate or refrain from deactivating the MG is to determine that the active BWP and the BWP with SSB have different carrier frequencies, or SCSs, or both.

Example 4 may include the method of example 1 and/or some other examples herein, wherein to refrain from activating the MG is to cause the UE to determine that the active BWP is a same BWP as the BWP with SSB, or that the active BWP and the BWP with SSB have same carrier frequency and SCS.

Example 5 may include the method of example 1 and/or some other examples herein, wherein the MG is activated with respect to a previous active BWP, and to deactivate the MG is to determine that the active BWP is different from the previous active BWP.

Example 6 may include the method of example 1 and/or some other examples herein, wherein to activate the MG and to measure the SSB with the MG, the method further comprising: measuring or causing to measure the SSB with respect to a carrier frequency and subcarrier spacing (SCS) of the BWP with SSB during the intra-frequency measurement; and refraining or causing to refrain from switching to the active BWP during the intra-frequency measurement.

Example 7 may include the method of example 1 and/or some other examples herein, wherein to refrain from activating or deactivating the MG and to measure the SSB without the MG, the method further comprising measuring or causing to measure the SSB with respect to a carrier frequency and subcarrier spacing (SCS) of the BWP with SSB during the intra-frequency measurement; and transmit to or receive from the AN in the active BWP during the intra-frequency measurement.

Example 8 may include the method of examples 1-7 and/or some other examples herein, further comprising decoding or causing to decode, upon reception of an MG configuration, the MG that is configured for the UE for the measurement of the SSB in the BWP with SSB.

Example 9 may include the method of examples 1-7 and/or some other examples herein, wherein the IE is MG configuration (MeasGapConfig) IE or a BWP-downlink IE.

Example 10 may include the method of examples 1-7 and/or some other examples herein, wherein the IE is to indicate one or more BWPs that are available for the activation of the MG based on the active BWP.

Example 11 may include the method of examples 1-7 and/or some other examples herein, further comprising receiving or causing to receive, from the AN, a synchronization signal that includes the SSB in the BWP with SSB.

Example 12 may include the method of examples 1-7 and/or some other examples herein, further comprising determining or causing to determine the active BWP among a plurality of BWPs based on an MG configuration message from the AN.

Example 13 may include the method of example 12 and/or some other examples herein, wherein the MG configuration message from the AN includes a downlink control information (DCI) to indicate the active BWP.

Example 14 may include the method of example 1 and/or some other examples herein, wherein the IE is further to indicate one or more additional MGs for the UE, and the method further comprising activating or causing to activate, refraining or causing to refrain from activating, or deactivating or causing to deactivate the one or more additional MGs respectively.

Example 15 may include the method of example 14 and/or some other examples herein, further comprising decoding or causing to decode, upon reception of the IE, an MG identification (ID) or a bit string to indicate an activation or deactivation of respective the one or more additional MGs.

Example 16 may include the method of examples 1-15 and/or some other examples herein, wherein the SSB is located in the initial BWP.

Example 17 may include the method of examples 1-15 and/or some other examples herein, wherein the SSB is located in the active BWP.

Example 18 may include the method of examples 1-17 and/or some other examples herein, wherein the SSB includes a set of SS blocks.

Example 19 may include a method comprising generating or causing to generate an IE of MG configuration (MeasGapConfig) or BWP downlink that is to indicate an activation of an MG based on an active BWP; and transmitting or causing to transmit the IE to a UE via RRC signaling.

Example 20 may include the method of example 19 and/or some other examples herein, wherein to transmit the IE, the method further comprising generating or causing to generate a configuration message that includes the IE of BWP downlink information to indicate the active BWP for the UE; and transmitting or causing to transmit the configuration message to the UE via DCI signaling.

Example 21 may include the method of examples 19 or 20, and/or some other examples herein, wherein the MeasGapConfig IE or the BWP downlink IE further include one or more additional MGs that are configured to the UE.

Example 22 may include the method of examples 1-21, and/or some other examples herein, wherein the method is performed by a UE or a portion thereof.

Example 23 may include a method comprising: generating or causing to generate an information element (IE) of measurement gap (MG) configuration (MeasGapConfig) or bandwidth part (BWP) downlink that is to indicate an activation of an MG based on an active BWP; and transmitting or causing to transmit the IE to a user equipment (UE) via radio resource control (RRC) signaling.

Example 24 may include the method of example 23, and/or some other examples herein, further comprising: generating or causing to generate a configuration message that includes the IE of BWP downlink information to indicate the active BWP for the UE; and transmitting or causing to transmit the configuration message to the UE via downlink control information (DCI).

Example 25 may include the method of examples 23 or 24, and/or some other examples herein, wherein the MeasGapConfig IE or the BWP downlink IE further include one or more additional MGs that are configured to the UE.

Example 26 may include the method of examples 23-25, and/or some other examples herein, wherein the method is performed by an access node (AN) or a portion thereof.

Example 27 may include an apparatus comprising means to perform one or more elements of the method described in or related to any of examples 1-26, or any other method or process described herein.

Example 28 may include one or more non-transitory computer-readable media comprising instructions to cause an electronic device, upon execution of the instructions by one or more processors of the electronic device, to perform one or more elements of the method described in or related to any of examples 1-26, or any other method or process described herein.

Example 29 may include an apparatus comprising logic, modules, and/or circuitry to perform one or more elements of the method described in or related to any of examples 1-26, or any other method or process described herein.

Example 30 may include a method, technique, or process as described in or related to any of examples 1-26, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of examples 1-26, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media (CRM) comprising instructions to, upon execution of the instructions by one or more processors of a user equipment (UE), cause the UE to:
   configure a capability of measurement gap (MG) activation for the UE to activate an MG that has been configured;
   decode, upon reception of a message from an access node (AN), an MG information element (IE) that configures a bandwidth part (BWP) and configures an MG in the configured BWP;
   activate the configured BWP to become an active BWP;
   activate the configured MG in the active BWP for measurement of a synchronization signal block (SSB) in an initial BWP that is different from the active BWP, wherein the initial BWP contains the SSB for measurement, and the initial BWP is configured for the UE to use for an initial access to a primary cell (PCell) or configured for the UE to operate at a secondary cell (SCell) activation; and
   measure the SSB in the initial BWP during an intra-frequency measurement with the activated MG.

2. The one or more non-transitory CRM of claim 1, wherein to activate the MG, the instructions further cause the UE to determine that the active BWP is different from the initial BWP.

3. The one or more non-transitory CRM of claim 1, wherein to activate the MG, the instructions further cause the UE to determine that the active BWP and the initial BWP have different carrier frequencies, or subcarrier spacings (SCSs), or both.

4. The one or more non-transitory CRM of claim 1, wherein the instructions further cause the UE to determine that the active BWP is a same BWP as the initial BWP, or that the active BWP and the initial BWP have a same carrier frequency and subcarrier spacing (SCS), and the UE is to refrain from activating the MG.

5. The one or more non-transitory CRM of claim 1, wherein to activate the MG and to measure the SSB with the MG, the instructions further cause the UE to:
   measure the SSB with respect to a carrier frequency and subcarrier spacing (SCS) of the initial BWP during the intra-frequency measurement; and
   refrain from switching to the active BWP during the intra-frequency measurement.

6. The one or more non-transitory CRM of claim 1, wherein to refrain from activating or deactivating the MG and to measure the SSB without the MG, the instructions further cause the UE to:

measure the SSB with respect to a carrier frequency and subcarrier spacing (SCS) of the initial BWP during the intra-frequency measurement; and transmit to or receive from the AN in the active BWP during the intra-frequency measurement.

7. The one or more non-transitory CRM of claim 1, wherein, upon execution, the instructions further cause the UE to decode, upon reception of an MG configuration, the MG that is configured for the UE for the measurement of the SSB in the initial BWP.

8. The one or more non-transitory CRM of claim 1, wherein the MG IE is an MG configuration (MeasGapConfig) IE or a BWP-Downlink IE.

9. The one or more non-transitory CRM of claim 1, wherein the MG IE is to indicate one or more BWPs that are available for the activation of the MG based on the active BWP.

10. The one or more non-transitory CRM of claim 1, wherein, upon execution, the instructions further cause the UE to determine the active BWP among a plurality of BWPs based on an MG configuration message from the AN.

11. The one or more non-transitory CRM of claim 10, wherein the MG configuration message from the AN includes a downlink control information (DCI) to indicate the active BWP.

12. The one or more non-transitory CRM of claim 1, wherein the MG IE is further to indicate one or more additional MGs for the UE, and upon execution, the instructions further cause the UE to activate the one or more additional MGs respectively.

13. The one or more non-transitory CRM of claim 12, wherein, upon execution, the instructions further cause the UE to decode, upon reception of the MG IE, an MG identification (ID) or a bit string to indicate an activation or deactivation of the one or more additional MGs.

14. The one or more non-transitory CRM of claim 13, wherein the MeasGapConfig IE or the BWP downlink IE further include one or more additional MGs that are configured to the UE.

15. One or more non-transitory, computer-readable media (CRM) comprising instructions to, upon execution of the instructions by one or more processors of an access node (AN), cause the AN to:

indicate to a user equipment (UE) that the UE is granted with a capability of determining activation of a measurement gap (MG) that has been configured;

generate an MG information element (IE) of MG configuration (MeasGapConfig IE) or a bandwidth part (BWP) downlink IE that configures a BWP that can be activated to become an active BWP and configures the MG in the active BWP, wherein the configured MG is to be activated in the active BWP for measurement of a synchronization signal block (SSB) in an initial BWP that is different from the active BWP, wherein the initial BWP contains the SSB used for measurement, and the initial BWP is configured for the UE to use for an initial access to a primary cell (PCell) or configured for the UE to operate at a secondary cell (SCell) activation; and transmit the MG IE to a user equipment (UE) via radio resource control (RRC) signaling.

16. The one or more non-transitory CRM of claim 15, wherein to transmit the MG IE, the instructions further cause the AN to:

generate a configuration message that includes the MG IE of BWP downlink information to indicate the active BWP for the UE; and transmit the configuration message to the UE via downlink control information (DCI).

17. A user equipment (UE), comprising:
interface circuitry to:
  decode a measurement gap (MG) information element (IE) of a downlink bandwidth part (BWP) (BWP-Downlink) that configures a BWP and configures an MG in the configured BWP; and
processing circuitry coupled with the interface circuitry, the processing circuitry configured to:
  activate the configured BWP to become an active BWP;
  activate the configured MG in the active BWP for measurement of a synchronization signal block (SSB) in an initial BWP that is different from the active BWP, wherein the initial BWP contains the SSB for measurement, and the initial BWP is configured for the UE to use for an initial access to a primary cell (PCell) or configured for the UE to operate at a secondary cell (SCell) activation; and
  measure the SSB in the initial BWP during an intra-frequency measurement with the activated MG based on activating the configured MG.

18. The UE of claim 17, wherein the processing circuitry is further to:
  determine whether the active BWP is different from the initial BWP; and
  activate the MG per BWP if the active BWP is different from the initial BWP.

* * * * *